(12) United States Patent
Boss

(10) Patent No.: US 7,172,800 B2
(45) Date of Patent: *Feb. 6, 2007

(54) SHEET MOLDING COMPOUND DAMPER COMPONENT, AND METHODS FOR MAKING AND USING THE SAME

(75) Inventor: Daniel Boss, Grayslake, IL (US)

(73) Assignee: Material Sciences Corporation, Elk Grove Village, IL (US)

( * ) Notice: Subject to any disclaimer, the term of this patent is extended or adjusted under 35 U.S.C. 154(b) by 263 days.

This patent is subject to a terminal disclaimer.

(21) Appl. No.: 10/698,938

(22) Filed: Nov. 3, 2003

(65) Prior Publication Data

US 2005/0095392 A1    May 5, 2005

(51) Int. Cl.
*B32B 7/02* (2006.01)
*B32B 27/20* (2006.01)
*B32B 27/30* (2006.01)
*B32B 27/28* (2006.01)
*B32B 27/36* (2006.01)

(52) U.S. Cl. .......................... 428/68; 428/76; 428/323; 428/212; 428/480; 428/482; 428/483; 428/421; 428/422; 720/698; 720/716; 188/378; 188/379; 248/638

(58) Field of Classification Search ...................... None
See application file for complete search history.

(56) References Cited

U.S. PATENT DOCUMENTS

| 3,640,836 A | | 2/1972 | Oberst et al. |
| 3,833,404 A | * | 9/1974 | Sperling et al. ............ 428/413 |
| 4,412,864 A | | 11/1983 | Kurashige et al. |
| 4,435,097 A | * | 3/1984 | Peterson ...................... 384/221 |
| 4,447,493 A | | 5/1984 | Driscoll et al. |
| 4,742,107 A | | 5/1988 | Statz |
| 4,822,834 A | | 4/1989 | Blevins |
| 4,838,939 A | | 6/1989 | Kanda et al. |
| 4,859,523 A | | 8/1989 | Endoh et al. |
| 4,942,219 A | | 7/1990 | Yatsuka et al. |
| 4,959,189 A | | 9/1990 | Rohrbacher et al. |
| 4,965,037 A | | 10/1990 | Weaver et al. |
| 5,009,821 A | | 4/1991 | Weaver |
| 5,087,491 A | | 2/1992 | Barrett |
| 5,203,435 A | | 4/1993 | Dolgin |
| 5,229,216 A | | 7/1993 | Watanabe et al. |
| 5,262,232 A | | 11/1993 | Wilfong et al. |
| 5,282,100 A | | 1/1994 | Tacklind et al. |
| 5,288,813 A | | 2/1994 | Hirakouchi et al. |
| 5,342,465 A | | 8/1994 | Bronowicki et al. |
| 5,356,264 A | * | 10/1994 | Watson et al. .............. 415/119 |
| 5,356,715 A | | 10/1994 | Levine et al. |
| 5,362,572 A | | 11/1994 | Hamada et al. |
| 5,368,914 A | | 11/1994 | Barrett |
| 5,411,810 A | | 5/1995 | Hirakouchi et al. |
| 5,420,170 A | | 5/1995 | Lutter et al. |

(Continued)

*Primary Examiner*—Vivian Chen
(74) *Attorney, Agent, or Firm*—Berenato, White & Stavish

(57) ABSTRACT

A damper component for absorbing and dissipating vibration and/or noise resonating from a device is provided. The damper component includes a viscoelastic damper layer, and a continuous constraining layer intimately contacting and encasing the damper layer. The constraining layer has a greater stiffness and higher modulus of dynamic shearing elasticity than the damper layer. The constraining layer is a molded sheet molding compound that is substantially immiscible with the viscoelastomer to provide a discrete interface between the constraining layer and the damper layer.

24 Claims, 15 Drawing Sheets

U.S. PATENT DOCUMENTS

| | | |
|---|---|---|
| 5,507,477 A | 4/1996 | Manning et al. |
| 5,540,173 A | 7/1996 | Tucker et al. |
| 5,578,680 A | 11/1996 | Ando et al. |
| 5,609,703 A | 3/1997 | Hamada et al. |
| 5,695,867 A * | 12/1997 | Saitoh et al. ............... 428/219 |
| 5,712,038 A * | 1/1998 | Yamazaki et al. ....... 428/411.1 |
| 5,725,931 A * | 3/1998 | Landin et al. ............... 428/134 |
| 5,761,184 A * | 6/1998 | Dauber et al. ............. 720/694 |
| 5,800,888 A | 9/1998 | Yasumoto et al. |
| 5,833,320 A | 11/1998 | Kaneko et al. |
| 5,842,686 A | 12/1998 | Hansen et al. |
| 5,851,327 A | 12/1998 | Landin |
| 5,855,353 A * | 1/1999 | Shaffer et al. ............. 248/638 |
| 5,858,521 A * | 1/1999 | Okuda et al. ............... 428/219 |
| 5,916,954 A | 6/1999 | Bohn et al. |
| 5,918,564 A | 7/1999 | Ohtsuka et al. |
| 5,939,179 A | 8/1999 | Yano et al. |
| 5,945,643 A | 8/1999 | Casser |
| 5,958,556 A * | 9/1999 | McCutcheon ............... 428/172 |
| 5,965,249 A | 10/1999 | Sutton et al. |
| 5,984,043 A | 11/1999 | Ruhe et al. |
| 6,048,426 A | 4/2000 | Pratt |
| 6,108,825 A | 8/2000 | Bell et al. |
| 6,130,284 A | 10/2000 | Singh |
| 6,155,932 A | 12/2000 | Cabales et al. |
| 6,177,173 B1 | 1/2001 | Nelson |
| 6,202,217 B1 | 3/2001 | Karall |
| 6,202,462 B1 | 3/2001 | Hansen et al. |
| 6,245,419 B1 | 6/2001 | Hakotani et al. |
| 6,285,525 B1 * | 9/2001 | McCutcheon et al. ... 360/98.08 |
| 6,298,963 B1 * | 10/2001 | Kim .......................... 188/379 |
| 6,465,110 B1 * | 10/2002 | Boss et al. .................. 428/608 |
| 6,529,345 B1 | 3/2003 | Butler et al. |
| 6,536,555 B1 | 3/2003 | Kelsic et al. |
| 6,846,893 B1 * | 1/2005 | Sherman et al. ............. 528/28 |
| 2002/0054475 A1 * | 5/2002 | Boss et al. .................. 361/685 |
| 2005/0094311 A1 * | 5/2005 | Boss et al. ............... 360/97.01 |

* cited by examiner

SHEET MOLDING COMPOUND DAMPER COMPONENT, AND METHODS FOR MAKING AND USING THE SAME

CROSS REFERENCE TO RELATED APPLICATION

This application relates to co-pending application entitled "Damped Disc Drive Assembly, and Method for Damping Disc Drive Assembly," which has been filed on the same date and assigned to the same assignee as this application.

BACKGROUND OF THE INVENTION

1. Field of the Invention

The present invention relates to damper components of the type for reducing or eliminating the resonation of vibration and/or noise, and to methods for making and using damper components.

2. Description of the Related Art

Unsaturated polyester sheet molding compounds, also known in the art and referred to herein as "SMCs," have physical properties and ease of processability that have made the materials popular in the production of a wide array of goods. For example, SMCs are found in parts of household appliances, motor vehicles, computer disk drives, and other apparatuses and devices having moving parts that generate vibration and noise. SMC are also found in generally static articles, such as in walls, siding, and doors of residential and commercial buildings and construction.

SMCs possess some capacity to absorb and dissipate vibration and noise resonating from a proximal source. However, SMCs are sometimes deemed to lack sufficient vibration-damping and noise-damping properties for certain situations requiring a high degree of vibration and noise insulation.

Viscoelastic materials are known for their ability to absorb and dissipate vibrational energy and to damp associated noise and vibration. In use, a viscoelastic material is typically applied directly to devices that emanate/resonate noise and vibration. The viscoelastic materials are bonded to or otherwise operatively associated with a device as a "free layer," that is, as a one-layer structure. Viscoelastic materials need not be used in isolation. For example, a substrate may be placed on one surface of a viscoelastic layer to form a composite, which may then be bonded to or otherwise operatively associated with a device so that the viscoelastic layer is bonded to or faces the structure. It is known to incorporate viscoelastic materials in structural laminates comprising a pair of metallic sheets (or metallic skins) sandwiching the viscoelastic material, as disclosed as an embodiment in U.S. Pat. No. 6,202,462 to Hansen et al., assigned to the same assignee of this application. The laminate metallic skins between which the viscoelastic material is placed are known as constraining layers.

Each of the aforementioned viscoelastic materials and composites has drawbacks. In many of the above-described embodiments, the viscoelastic material is placed in direct contact with the device to be damped. As a consequence, the viscoelastic layer and optionally an attached substrate must be molded or otherwise shaped to match the surface contours of the device. However, viscoelastic layers and metallic skins generally lack sufficient moldability or malleability to allow them to be fabricated for and placed in continuous intimate contact with vibration/noise-resonating devices having complex shapes.

The aforementioned free viscoelastic layer and composite have additional drawbacks associated with their methods of use. Typically, a free viscoelastic layer or a composite is either attached to the outer surface of the device to be damped or is installed in a housing of the device. In both instances, the damper constitutes an additional structure that otherwise would not be present, thereby imposing weight and space penalties. For example, depending upon the location of the damper, added space must be afforded inside or outside of the device's housing to receive the damper. Manufacturing time and costs are also increased by the addition of a damper structure to a vibrating or noise resonating device or structure.

Additionally, placement of damper layers on a device or structure may create design tradeoffs. For example, complex shapes are often not amenable to add-on treatments. Accordingly, parts or portions of a vibrating/noise-resonating device or structure that are not or cannot be associated with a damper layer, for example, due to the complex shape of the device or structure, can adversely affect dampening effectiveness.

Accordingly, it would be a significant improvement in the art to provide a damper component that replaces an existing component of the damped device to thereby eliminate or at least alleviate the imposed weight and space penalties, preferably while avoiding the need for compromising design tradeoffs.

3. Objects of the Invention

Accordingly, it is an object of the present invention to provide a damper component that is readily formable into a desired shape, including a complex shape, for permitting placement of the damper component in intimate contact with a vibration/noise-emanating device or structure.

It is another object of the present invention to provide a damper component that may replace an existing component of a device or structure to be damped and thereby achieve a significant improvement in the art over known dampers.

It is another object of the present invention to provide methods for making a damper component, including methods for making damper components that achieve one or more of the above-discussed objects.

It is a further object of the present invention to provide a device comprising a damper component, in which the damper component replaces an existing structure as a functional or structural component of the device.

It is still a further object of the present invention to provide a method for retrofitting an existing structure or device to replace an existing component with a damper component having a substantially identical shape and/or appearance to the existing component.

SUMMARY OF THE INVENTION

To achieve one or more of the foregoing objects, and in accordance with the purposes of the invention as embodied and broadly described in this document, according to a first aspect of this invention there is provided a damper component for absorbing and dissipating vibration and/or noise resonating from a device, the damper component comprising a damper layer and a continuous constraining layer intimately contacting and encasing the damper layer. The damper layer comprises a viscoelastomer. The constraining layer has a greater stiffness and higher modulus of dynamic shearing elasticity than the damper layer. The constraining layer is molded from a sheet molding compound that is substantially immiscible with the viscoelastomer, thus providing a discrete interface between the constraining layer and the damper layer.

According to a second aspect of this invention, there is provided a damper component for absorbing and dissipating vibration and/or noise resonating from a device, the damper component comprising a fragmented damper layer and a continuous constraining layer. The fragmented damper layer comprises a plurality of fragments that are noncontinuous with each other to provide interstices between the noncontinuous fragments. The fragmented damper layer comprises a viscoelastomer. The constraining layer intimately contacts and encases the fragmented damper layer to fill the interstices between the noncontinuous fragments. The constraining layer has a greater stiffness and higher modulus of dynamic shearing elasticity than the fragmented damper layer. The constraining layer is molded from a melt-flowable matrix comprising a sheet molding compound that is substantially immiscible with the viscoelastomer to provide discrete interfaces between the constraining layer and the noncontinuous fragments.

According to a third aspect of the invention, there is provided a method for making a damper component for damping of noise and/or vibration. The method of this aspect of the invention comprises providing a damper layer comprising a viscoelastomer, arranging at least one sheet molding compound sheet adjacent the damper layer to form a laminate, placing the damper layer and the sheet molding compound sheet in a mold cavity of a mold, and heating the laminate under pressure in the mold to cure (or further cure) the sheet molding compound sheet to form a continuous constraining layer encasing the damper layer. The constraining layer has a greater stiffness and higher modulus of dynamic shearing elasticity than the damper layer. The sheet molding compound of the constraining layer is preferably substantially immiscible with the viscoelastomer to provide a discrete interface between the continuous constraining layer and the damper layer.

According to a fourth aspect of the invention, there is provided a device comprising a damper component embodied by the present invention. An example of such a device is a disc drive assembly comprising a head disc assembly and a housing. The head disc assembly comprises a disc having a surface and a track for storage of information, a head for writing and reading information to and from the disc, and an actuator arm for moving the head relative to the surface of the disc. The housing comprises a base and a cover cooperating with one another to form a chamber therebetween in which at least a portion of the head disc assembly is housed. The base and/or the cover is/are constructed as a damper component for damping noise and/or vibration resonated by the head disc assembly. The damper compound comprises a damper layer comprising a viscoelastomer, and a continuous constraining layer intimately contacting and encasing the damper layer, the constraining layer having a greater stiffness and higher modulus of dynamic shearing elasticity than the damper layer. The constraining layer is molded from a high density filler and a melt-flowable polymer matrix that is immiscible with and not substantially chemically bonded to the viscoelastomer.

According to a fifth embodiment of the invention, there is provided a method for retrofitting a device that resonates vibration and/or noise. The method comprises removing a structural component of the device through which the vibration and/or noise resonates, and replacing the structural component with a damper component according to an embodiment of the present invention.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

Figure 1:
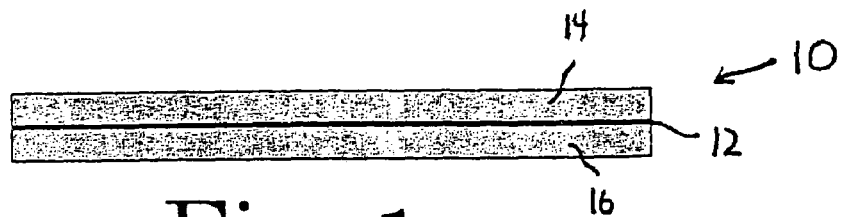
FIG. 1 is a cross-sectional view illustrating a damper precursor laminate according to an embodiment of the invention.

DETAILED DESCRIPTION OF PREFERRED EMBODIMENTS AND PREFERRED METHODS OF THE INVENTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise. For example, a damper component comprising "a damper layer" and "a constraining layer" may include one or more damper layers and one or more constraining layers, unless the context clearly dictates otherwise.

FIG. 1 is a cross-sectional view illustrating a damper precursor laminate, that is, a laminate prior to being processed into a damper component of an embodiment of the present invention. The damper precursor laminate comprises a laminate body, generally designated by reference numeral 10. The laminate body 10 of the illustrated embodiment optionally may be rolled into substantially cylindrical stock for accommodating storage of the stock. The laminate body 10 comprises a viscoelastic sheet 12 interposed between a first SMC sheet 14 and a second SMC sheet 16. As will be discussed in greater detail below, the first and second SMC sheets 14 and 16 are preferably in B-stage, that is, a partially cured state, and are capable of being molded together under suitable temperature and/or pressure to form a cured, continuous constraining layer. In the illustrated embodiment of FIG. 1, the viscoelastic sheet 12 and the first and second SMC sheets 14 and 16 of the damper precursor laminate 10 each comprise a respective continuous, non-fragmented body at this stage in processing. The illustrated B-stage sheets are not exhaustive of the scope of the invention. For example, the sheet molding compound may be introduced into the mold cavity in an uncured or substantially uncured liquid state.

Figure 2:
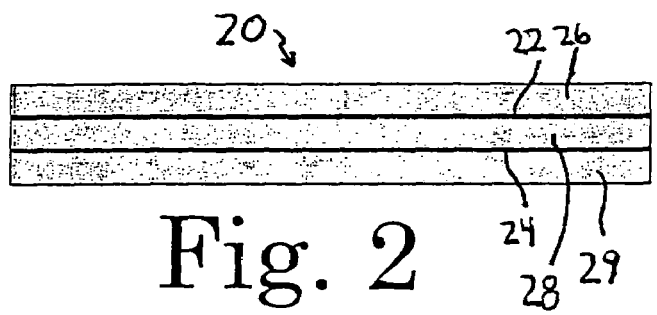
FIG. 2 is a cross-sectional view illustrating a damper precursor laminate according to another embodiment of the invention.

FIG. 2 is a cross-sectional view illustrating a damper precursor laminate according to another embodiment of the invention. The damper precursor laminate of the embodiment illustrated in FIG. 2 comprises a laminate body, generally designated by reference numeral 20. The laminate body 20 comprises a first viscoelastic sheet 22, a second viscoelastic sheet 24, a first sheet molding compound (SMC) sheet 26, a second SMC sheet 28, and a third SMC sheet 29. The first viscoelastic sheet 22 is interposed between the first and second SMC sheets 26 and 28. Likewise, the second viscoelastic sheet 24 is interposed between the second and third SMC sheets 28 and 29 to provide alternating viscoelastic and SMC sheets. As illustrated, the edges of each sheet 22, 24, 26, 28, and 29 optionally may be exposed at the opposite ends of the precursor laminate 20.

According to another embodiment of the invention, a damper precursor laminate or laminate body, such as that of FIG. 1 or FIG. 2, is rolled into a "jelly-roll" configuration, in which the layers are situated in spiral profiles. The jelly-roll is preferably yet optionally embodied as one or more SMC sheets overlaid with one or more viscoelastic sheets, preferably in a non-alternating manner. The sheets are then collectively rolled one or a plurality of revolutions to form the jelly-roll. Preferably, the SMC sheet defines the outermost layer of the jelly-roll.

The damper precursor laminate of the present invention is not necessarily limited to the shapes and sheet arrangements illustrated in FIGS. 1 and 2 and the above-described jelly-roll. For example, in FIGS. 1 and 2 and the above-described jelly-roll the SMC sheets alternate with the viscoelastic sheets. It is within the scope of the present invention to arrange a plurality of SMC sheets immediately adjacent one another (with no interposing viscoelastic sheet) or to arrange a plurality of viscoelastic sheets immediately adjacent one another (with no interposing SMC sheets). It is also within the scope of this invention for the damper precursor laminate to comprise a viscoelastic sheet or viscoelastic sheets as a surface layer of the laminate body, especially when the laminate body is introduced into the mold cavity as a jelly roll. Further, the laminate body may have a different number of total sheets than described above and illustrated in FIGS. 1 and 2. Moreover, the laminate body may include sheets of material other than the SMC and viscoelastic sheets, although the laminate body preferably consists essentially of, and more preferably consists of, the SMC and viscoelastic sheets.

According to another embodiment, the damper precursor laminate comprises a SMC B-stage resin sheet having the viscoelastomer or fragments thereof incorporated into the resin sheet prior to molding, that is, during fabrication of the SMC resin sheet.

FIGS. 1 and 2 depict SMC sheets (14 and 16 in FIG. 1; 26, 28, and 29 in FIG. 2) having an identical thickness. However, the thickness of the SMC sheets may differ from one another. Similarly, although FIG. 2 depicts the first and second viscoelastic sheets (22 and 24) having equal thickness, these sheets 22 and 24 may each have a thickness different from the other. Preferably, the SMC sheets are each thicker than the viscoelastic sheets. The thickness of each layer may be determined and adjusted based on the intended application of the damper component, as well as other factors, including, for example, the materials selected for the SMC and viscoelastic layers. By way of example and not necessarily limitation, the viscoelastic sheets of an embodiment of the invention has a thickness in a range of about 0.1 mil to about 10 mil (2.54 microns to 254 microns). According to another embodiment, the thickness range of the viscoelastic sheet is about 3 mil to about 5 mil (76.2 microns to 127 microns). The SMC sheets may each have a thickness, for example, in a range of about 10 mil to about 500 mil (254 microns to 1.27 cm), or about 50 mil to about 250 mil (0.127 cm to 0.635 cm), wherein a mil equals 0.001 inch. The thickness of the SMC sheets may change during molding.

Each of the SMC sheets may be comprised of a composition that is the same as or different from that of the other SMC sheet(s). However, for most applications it is preferred that each of the SMC sheets comprises a substantially identical composition. Similarly, referring to the embodiment illustrated in FIG. 2, in the event the damper precursor laminate comprises two or more viscoelastic sheets, e.g., 22/24, the viscoelastic sheets may each be comprised of a substantially identical composition or may comprise different compositions from one another.

According to embodiments of the invention, the viscoelastic sheets may comprise, consist essentially of, or consist of one or more viscoelastomers. A viscoelastomer is stress-strain responsive. At a given temperature, the stress-strain response of a viscoelastomer is dependent upon the strain rate. At high strain rates, a viscoelastomer will exhibit more elastic behavior, while at low strain rates a viscoelastomer will exhibit more viscous behavior. A viscous behavior is generally defined as the ability of the material to significantly deform under load and to convert the energy stored by deformation into heat. An elastic behavior is the ability to exhibit a reversible deformation under load. The viscoelastic layer preferably comprises, and more preferably consists essentially of, at least one member selected from the group consisting of a (meth)acrylic acid based polymer and a (meth)acrylate-based polymer. As referred to herein as generally used in the art, the term (meth)acrylic means acrylic and/or methacrylic. Similarly, the term (meth)acrylate means acrylate and/or methacrylate. By way of example and not necessarily limitation, suitable (meth)acrylate-based polymers include acrylic acid ester homopolymers. The (meth)acrylate-based polymer may also comprise copolymers or terpolymers of a plurality of different (meth)acrylic acid esters or a combination of a (meth)acrylic acid ester and one or more copolymerizable monomer, oligomers, or prepolymers. In the case of copolymers and terpolymers, the (meth)acrylate-based polymer fraction may constitute a majority (more than 50 weight percent) of the total weight of polymer(s) in the viscoelastic material. According to another embodiment of the present invention, the viscoelastic layer may comprise a rubber, such as nitrile rubbers (e.g., acrylonitrile, acetonitrile), silicone rubber, fluoroelastomers, other elastomers, and combinations thereof. A currently preferred viscoelastic material is 5-mil tape of Avery Dennison™ UHA 1185, an acrylic adhesive available from AveryDennison.

The choice of viscoelastic material may optionally take into consideration the likely operating temperature to which the damper component will be subject during use. The viscoelastic material preferably has a glass transition temperature ($T_g$) at or below the operating temperature of the device to be damped. The viscoelastic material preferably has high damping properties near the intended operating temperature. Selection of the viscoelastic material may take into account the loss factor of the SMC and the viscoelastomer, and the desired loss factor to be achieved. Loss factor is generally understood in the art as the ratio of dissipated energy (or energy loss) per radian divided by the peak potential or strain energy of a specimen. In an embodiment of the invention the loss factor (measured by ASTM E 756–98) of the viscoelastic material is greater than 0.5, and in another embodiment greater than 1.0, at the targeted temperatures. The viscoelastic layer may optionally contain fillers, such as carbon nanotubes, chopped fibers (e.g., glass, carbon, aramid), inorganic particles (e.g., silica), fly ash, etc. According to an embodiment of the invention, however, the viscoelastic layer optionally may be substantially free of fillers, especially inorganic fillers such as silica.

As discussed above, the SMC sheets melt-flow about the viscoelastic damper layer and consolidate with one another during molding to establish the constraining layer encasing the viscoelastic damper layer. Prior to molding, the SMC sheets preferably comprise an unsaturated (or partially saturated) polyester sheet molding compound (SMC). The selected SMC preferably is substantially immiscible and preferably does not significantly chemically react with the viscoelastomer during molding so that, subsequent to molding, there is a discrete interface, preferably with substantially no interfacial bonding, between the constraining layer and the viscoelastic layer. Representative SMC sheets are available from, for example, PreMix, Inc. and Ashland Chemical. The constraining layer optionally also includes a filler, and more preferably a high-density filler. The term "high density" as used herein means a density greater than that of the sheet molding compound. A currently preferred filler comprises chopped fiberglass. Other fillers that may be used alone, in combination with one another, or in combination with fiberglass include, for example, carbon, aramids, metal, plastics, alumina, silica, silicon, ceramics, graphite, ferrite, ferrophosphorus, bauxite, combinations thereof, and the like. The fillers may be present as fibers, particles, powder, nanotubes (where appropriate), granules, and the like. The fillers are preferably yet optionally present in non-woven form, and are optionally dispersed substantially homogeneously throughout the constraining layer.

As discussed above, in embodiment of the invention the SMC sheets and viscoelastic layer may be arranged as a "jelly roll" or sheet stack prior to introduction into the mold cavity. Generally, sheet stacks comprise a composite of alternating layers of SMC and viscoelastic sheets laid flat. A jelly roll is similar to a sheet stack, but has been rolled along its length or width to provide a spiral profile of sheets. A jelly roll may consist of one SMC sheet and one viscoelastic sheet, with the SMC sheet preferably constituting the outer layer.

A method for making the damper component from the precursor laminate according to embodiments of the present invention will be described below. It is to be understood that the damper component of embodiments of this invention is not limited to the following method, and may be made by methods other than that described below. Likewise, the description below is not exhaustive and does not necessarily limit the scope of the inventive method.

Returning to FIG. 1, processing of the damper precursor laminate 10 may optionally comprise a consolidation step. For example, the damper precursor laminate 10 may be passed through a cold rolling assembly of the type disclosed in U.S. Pat. No. 6,202,462, which is incorporated herein by reference. Generally, the laminate 10 is in the form of an elongated, continuous web that is rolled on a supply coil, and is fed continuously through the cold rolling assembly. The assembly may include one or more roller sets sufficient in number to reduce the thickness of the web to a desired consolidated thickness, whether said thickness is selected as prescribed in the '462 patent or otherwise. Each of the roller sets includes a pair of rollers facing one another, between which the web is passed in a known manner, preferably continuously. The roller sets may be arranged successively closer together to effect a gradual reduction in thickness.

The damper precursor laminate 10, optionally after having undergone thickness reduction as described above, is then charged or otherwise introduced into a suitable molding apparatus. At the time of introduction, the laminate may be in the form of, for example, a flat multi-layer board or a jelly-roll. It is to be understood, however, that the charging step may alternatively comprise separately charging the viscoelastic sheet 12 and the SMC sheets 14 and 16 into the molding apparatus as separate entities so that the laminate is first formed in the molding apparatus. The SMC materials may be in B-stage cure state, or the SMC materials may be cured to a greater or lesser degree prior to introduction into the mold. Examples of a molding apparatus that may be used for this embodiment of the method of the present invention include those suitable for carrying out, for example, compression molding and/or transfer molding. It is to be understood that other molding techniques may be used within the scope of aspects of this invention. It is also to be understood that a standard, commercially available molding apparatus may be used.

In a preferred embodiment of the present invention, the SMC sheets 14 and 16 charged into the molding apparatus are in a partially cured state, that is, the sheets are B-stage resins when introduced into the molding apparatus. An exemplary partially cured resin is an unsaturated polyester. The SMC sheets may optionally include curing agents/initiators to facilitate cure. Commercially available SMC sheets often include curing agents, such as peroxides and the like. On the other hand, the viscoelastic sheet 12 is preferably yet optionally fully or substantially fully cured when introduced into the molding apparatus. The molding apparatus is then closed or partially closed, depending upon the designed operation of the apparatus.

While in the molding apparatus, the laminate 10 is subject to heat and preferably pressure. The selected temperature and pressure may vary, for example, depending upon the SMC sheet resins selected and complexity of the mold shape. Generally, the temperature is greater than the melt temperature of the SMC sheet resin and preferably is high enough to induce melt-flow and cure of the SMC sheet resins. An example of a suitable temperature range used with polyester resins is about 175° C. to about 250° C. An example of a suitable pressure range used with the same resins is about 500 psi to about 5000 psi. Temperature and pressure may be maintained substantially constant or may be varied during molding.

Figure 3:
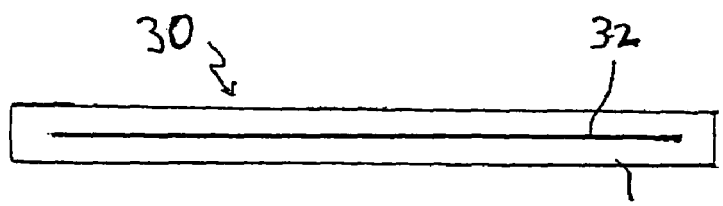
FIG. 3 is a cross-sectional view of a damper component according to a preferred embodiment of the present invention.

Preferably, the molding conditions are effective to cause the first and second SMC sheets 14 and 16 to melt, or partially melt and consolidate with one another to form a continuous constraining layer 34, as best shown in FIG. 3. The mold conditions and mold cavity size preferably are adequate to cause the first and second SMC sheets 14 and 16 to flow around the edges and ends of the viscoelastic sheet 12 so that, upon cooling, the resulting continuous constraining layer 34 intimately contacts and encases the viscoelastic layer 32. In the event that a B-stage resin is selected for the sheet molding compound, molding conditions are preferably sufficient to induce continued cure of the sheets 14 and 16. In their fully cured state, that is, when removed from the mold, the constraining layer 34 may be a thermoplastic or a thermoset, although the constraining layer is preferably a thermoset. Although the damper component 30 is illustrated as having a substantially rectangular cross-section, it is to be understood that the outer surfaces of the constraining layer 34 may undertake a shaped profile, as dictated by the mold die surfaces.

In an optional embodiment, the molding process is performed under conditions effective to generate a sufficiently robust internal material flow and mixing action within the mold for shearing the viscoelastic sheet 12 into a fragmented damper layer comprising a plurality of fragments that are noncontinuous with each other. Generally, jelly rolls are more susceptible to fragmentation than stacked sheets. Without wishing to be bound by any theory, it is believed that during molding jelly rolls undergo more deformation along their z-axis (i.e., perpendicular to their surface planes) and are more greatly influenced by shearing forces than an unrolled stack of sheets.

Figure 4:
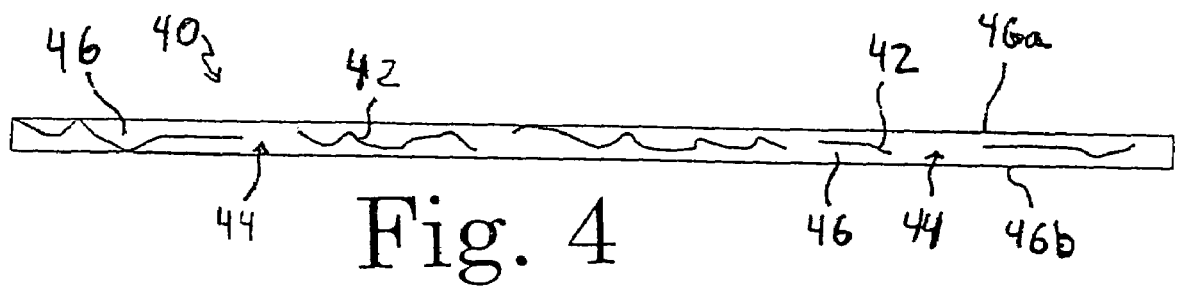
FIG. 4 is a cross-sectional view of a damper component according to another preferred embodiment of the present invention.

The embodiment illustrated in FIG. 4 depicts a two-layer jelly-roll after it has been molded into a damper component 40 in accordance with an embodiment of the method of the invention. As best shown in FIG. 4, the viscoelastic sheet has been sheared in a fragmented damper layer comprising a plurality of fragments 42 that are noncontinuous with one another to provide interstices, generally designated by reference numeral 44, between the noncontinuous fragments 42. The SMC sheet or sheets are consolidated into a continuous constraining layer 46 intimately contacting and encasing the fragmented damper layer fragments 42 and filling the interstices 44 between the noncontinuous fragments 42. As further shown in FIG. 4, the fragments 42 of the fragmented damper layer may possess a non-linear profile and may lie in different planes from one another. Generally, most and more preferably all of the fragments 42 are located between opposite surfaces 46a and 46b of the continuous constraining layer 46 and are hidden from view.

The constraining layer 46 (or 34) has a greater stiffness and modulus than the fragmented damper layer 44 (or continuous damper layer 32), thereby providing structural support to the damper component 40 (or 30). For example, the viscoelastomer damper layer 44 (or 32) may have a shear modulus on the order of about 1 psi to about 1000 psi, such as about 100 psi. The constraining layer 46 (or 34) may optionally have a shear modulus on the order of about 10,000 psi to about 3,000,000 psi, preferably above about 500,000 psi or above about 1,000,000. Preferably, the shear modulus (as measured by ASTM E143–02) of the constraining layer is at least 1, more preferably at least 2 or at least 3 orders of magnitude greater than the shear modulus of the damper layer. The constraining layer preferably yet optionally has a density greater than about 5.0 grams/cm$^3$ (g/cc).

In preferred embodiments of the present invention, the damper layer is principally responsible for absorbing and dissipating vibration and/or noise resonating from a device. However, the constraining layer may also contribute to the vibration and noise-damping properties of the damper component. The damper structure may comprise additional layers, both damping and non-damping. For example, a portion or all of the outer surface of the damper structure may include a coating. The coating material may be selected for various purposes, including aesthetics and protection from outside forces. The coating may be applied, for example, by painting or plating (e.g., electro or electroless plating).

A non-exhaustive list of devices and articles with which the damper component of embodiments of the present invention may be used for damping the resonance of sound and/or vibration include, for example, automobile parts, computer disk drives, household appliances, consumer electronics, power tools, industrial equipment, marine applications, sporting goods, and building components, such as walls and doors. In preferred embodiments of the invention, the damper component defines or replaces a functional or structural component of the device that it damps, such as to perform a function (other than damping) and/or to structurally support one or more other components. In still another preferred embodiment of the present invention, a retrofitting method is provided, which comprises replacing an existing structural component of the device with a damper component of the present invention. The high shapeability of the sheet molding compounds of the constraining layer makes it possible to mold the damper component into various complex shapes, including a shape (and dimensions) substantially identical to the replaced part.

Figure 17:
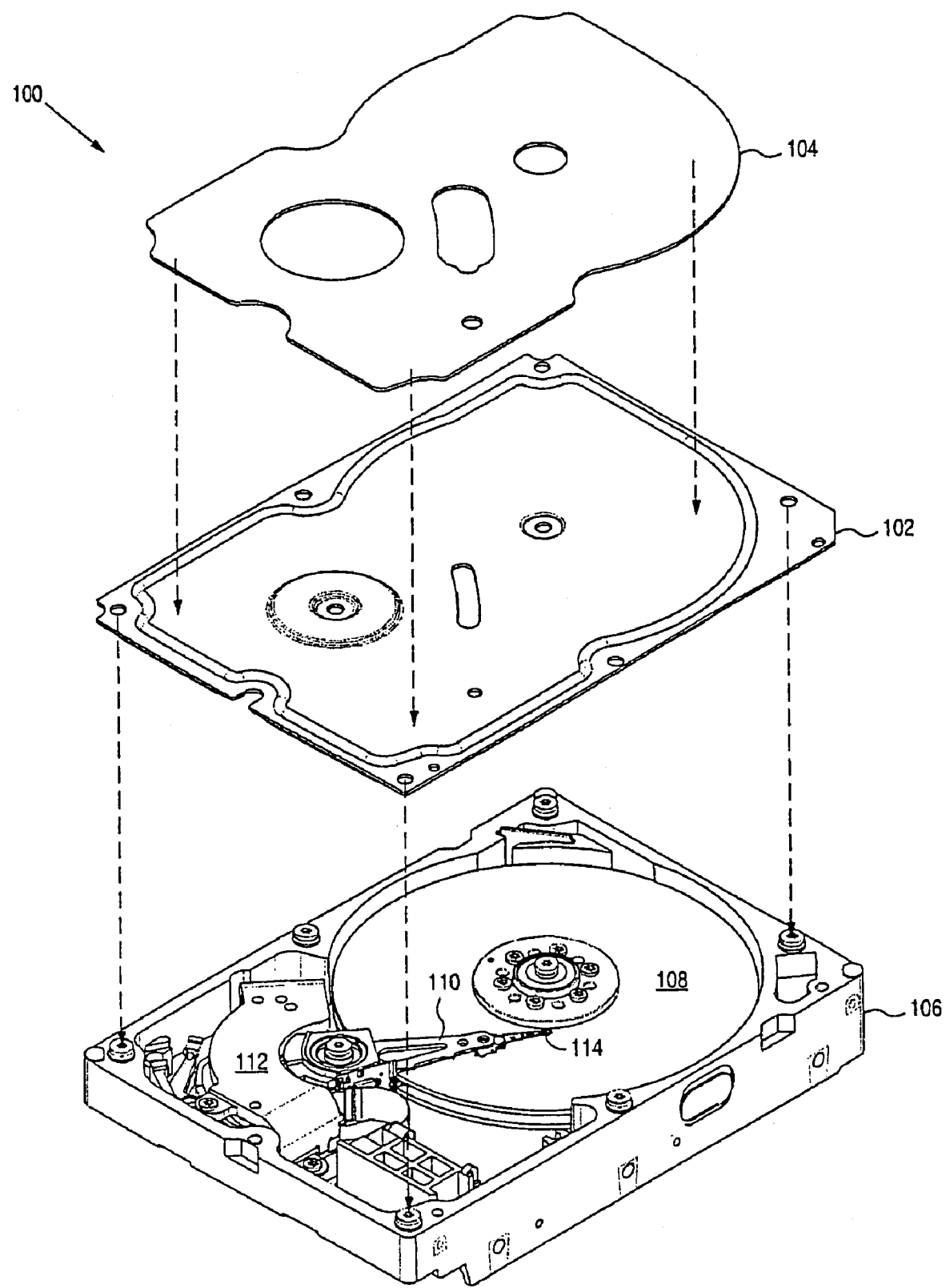
FIG. 17 is an exploded assembled view of a conventional disc drive assembly.

For example, disc drive units are well known in the art as data storage devices capable of storing a large amount of information generated by computers. FIG. 17 shows a conventional disc drive unit 100 illustrated in U.S. Pat. No. 6,529,345 and disclosed in U.S. Pat. No. 5,282,100. The disc drive unit includes a housing comprising a top cover mountable over and cooperating with a base 106 to establish an internal, sealed chamber. The cover comprises an inner layer 102 and an outer layer 104. Sealed inside of the chamber is a head-disc assembly comprising one or more circular discs 108 stacked yet spaced apart from one another on a spindle motor hub, which is rotatably driven by a spindle motor (not shown). The spindle motor may be fixed to the base and/or cover of the housing. The head-disc assembly further comprises a plurality of read/write heads, with one head 114 provided for each disc. The read/write head 114 transfers electronic data between the tracks on the discs 108 and the external environment, e.g., a computer monitor or printer. In the write mode, the head 114 writes data (input through an input source, such as a computer key board or scanner) onto the tracks of the disc 108. In the read mode, the head 114 retrieves stored information from the disc tracks for relaying the information to an output source, such as a display monitor, printer, or other storage medium.

Data and other information are stored over a majority of the surface of the rotatable disc or discs and, accordingly, are not accessible unless the head 114 can move sufficiently to reach a majority of the disc surface. To permit head 114 movement, the disc-head assembly further comprises one or more actuator arms 110 and actuator (e.g., voice coil) motors 112 for moving the head 114 radially across the disc surface to a desired location adjacent a surface or surfaces of each disc. Actuator arms and motors may be arranged in a wide variety of designs and configurations known and practiced in the art. In the illustrated device, the actuator arms 110 turn about a pivot bearing assembly. The pivot bearing assembly includes a stationary element such as a pivot journal fixed to the disc drive housing at the base and cover to define and stabilize a pivot axis. The actuator arms 110 move in response to energizing currents sent from the motors 112, which moves the disc-head assembly on the pivot axis, swinging the actuator arms 110 to move the head 114 radially relative to the disc 108 surface.

In conventional disc drive units, movements of the disc-head assembly, and in particular the actuator arms 110, tend to be relatively rapid and may cause the disc-head assembly to vibrate. The vibration tends to be transferred to the disc drive housing. The cover, and in some cases the base, of the disc drive housing commonly have a relative large surface area, which when vibrated, may radiate acoustic noise. In some cases, the cover may act as a speaker-like structure, producing undesirably high levels of acoustic noise. Additionally, operation of the spindle motor and rotation of the discs at high speeds (such as 7200 rpm) and airflow noise generated by the spinning discs contribute to the vibration and noise. Under some operating conditions, the acoustic noise may be sufficient to disturb or aggravate the user.

Figure 18:
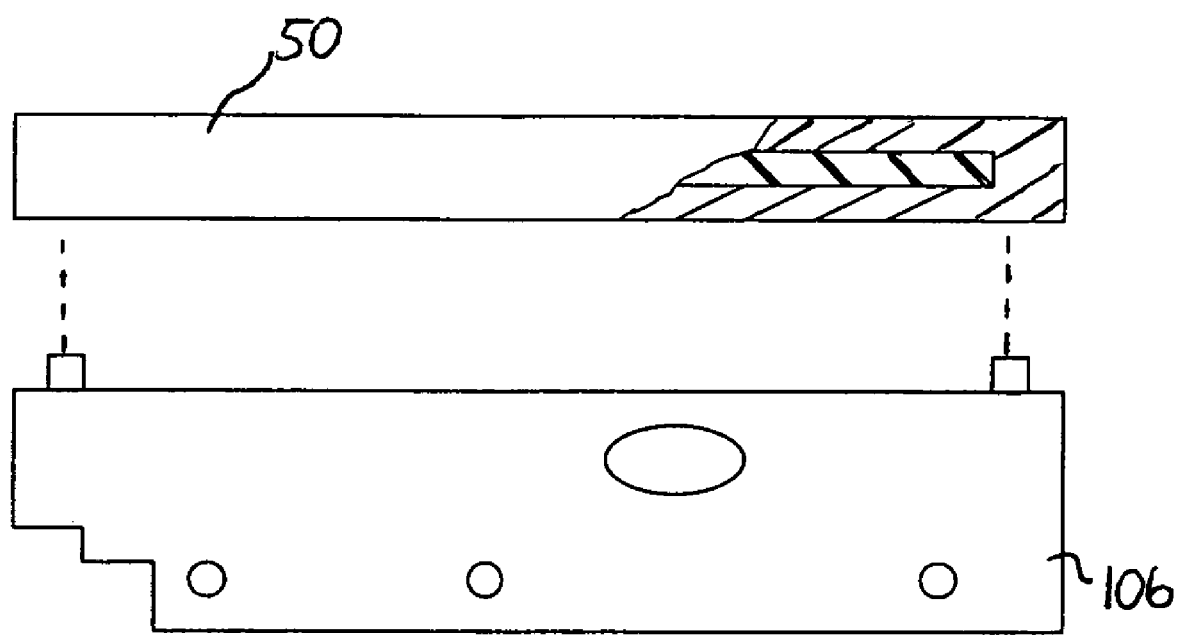
FIG. 18 is a side, elevational view partially sectioned of a computer disc drive housing having a cover damper component according to an embodiment of the present invention, in which the cover damper component is shown partially sectioned.

In accordance with an embodiment of the present invention illustrated in FIG. 18, a portion of the housing, and more preferably the entire cover and/or the entire base, is a damper component. The disc drive unit of FIG. 18 is substantially identical to that of FIG. 17, except that the cover of the disc drive unit of FIG. 17 has been replaced with a damper component 50 of an embodiment of the present invention. Preferably, the entirety of the base and/or the entirety of the top cover is formed of, rather than simply lined with, the damper component. Stated differently, the damper component has a damper body extending from the internal surface of the cover to the external surface of the cover. In one embodiment the damper component may contribute to the hermetic seal of the disc drive chamber, such as by cooperating with and mounting to the base 106. In another embodiment, the damper component may contribute to the structural support of the disc-head assembly. In the event that both the base and the cover comprise damping materials, the same or different damping materials may be used for making the base and the cover. Replacement of the base and/or the top cover with a damper component of the present invention is effective in damping the vibration and acoustic noises generated by movement of the actuator arms relative to the disc surfaces and the driving movement of the motor. The high moldability of the SMC material permits the molded damper component to possess a substantially identical shape to a non-damper base or cover, while not occupying excessive space.

In another preferred embodiment of the present invention, a retrofitting method is provided, which comprises replacing structural component of a device, such as the cover or base of a disc drive, with the damper component of the present invention. The high shapeability of the constraining layer makes it possible to mold the damper component into various complex shapes, including a shape (and dimensions) matching those of an existing structural component of a device.

EXAMPLES

The following examples serve to explain and elucidate the principles and practice of the present invention further. These examples are merely illustrative, and not exhaustive as to the scope of the present invention.

All percentages are weight percentages, unless specifically stated otherwise. The sheet molding compounds (SMCs) for the examples and comparative examples were obtained from Ashland Specialty Chemicals of Dublin, Ohio. The viscoelastic layer of the examples was Avery 1185 obtained from Avery Dennison. The precursor laminates were molded at a tool temperature of 300° F. (149° C.) at 100 psi to 400 psi for 3 minutes. The molded composites were cut into 0.5 inch×10 inch beams, and were tested with a mini hammer system. All modal tests were run from room temperature (70° F./21° C.) to 225° F. (107° C.) to represent a wide range of operating temperatures. The laminates were compared to a baseline SMC compound laminate (comparative examples) with no damping layer.

Example 1 and Comparative Example A

A damper precursor laminate was prepared containing three stacked layers of Arotech® 2002 SMC containing 60 weight percent glass and one viscoelastic layer inserted between the bottom two SMC layers. The laminate had charge dimensions of 8 inches×8 inches and a weight of 513 grams.

The laminate of Example 1 was compared to a baseline/control laminate of Comparative Example A, which consisted of a SMC compound made from a damper precursor laminate containing three-stacked layers of SMC as described above in Example 1, but with no viscoelastic damping layer. The laminate of Comparative Example A had charge dimensions of 8 inches×8 inches and a weight of 511 grams.

Figure 5:
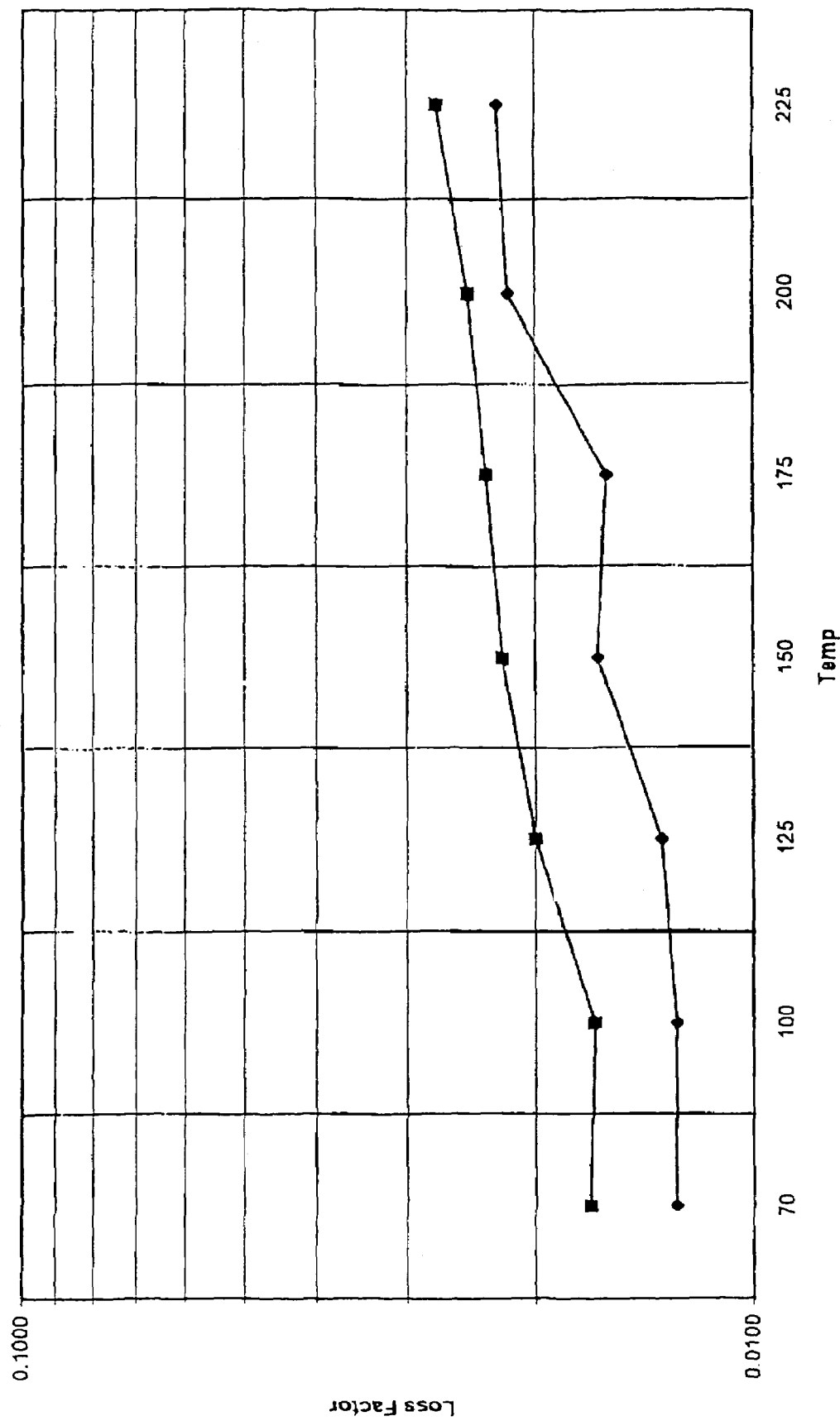
FIG. 5 and FIG. 6 each are graphs comparing the loss factors for Example 1 and Comparative Example A over a temperature range.
Figure 6:
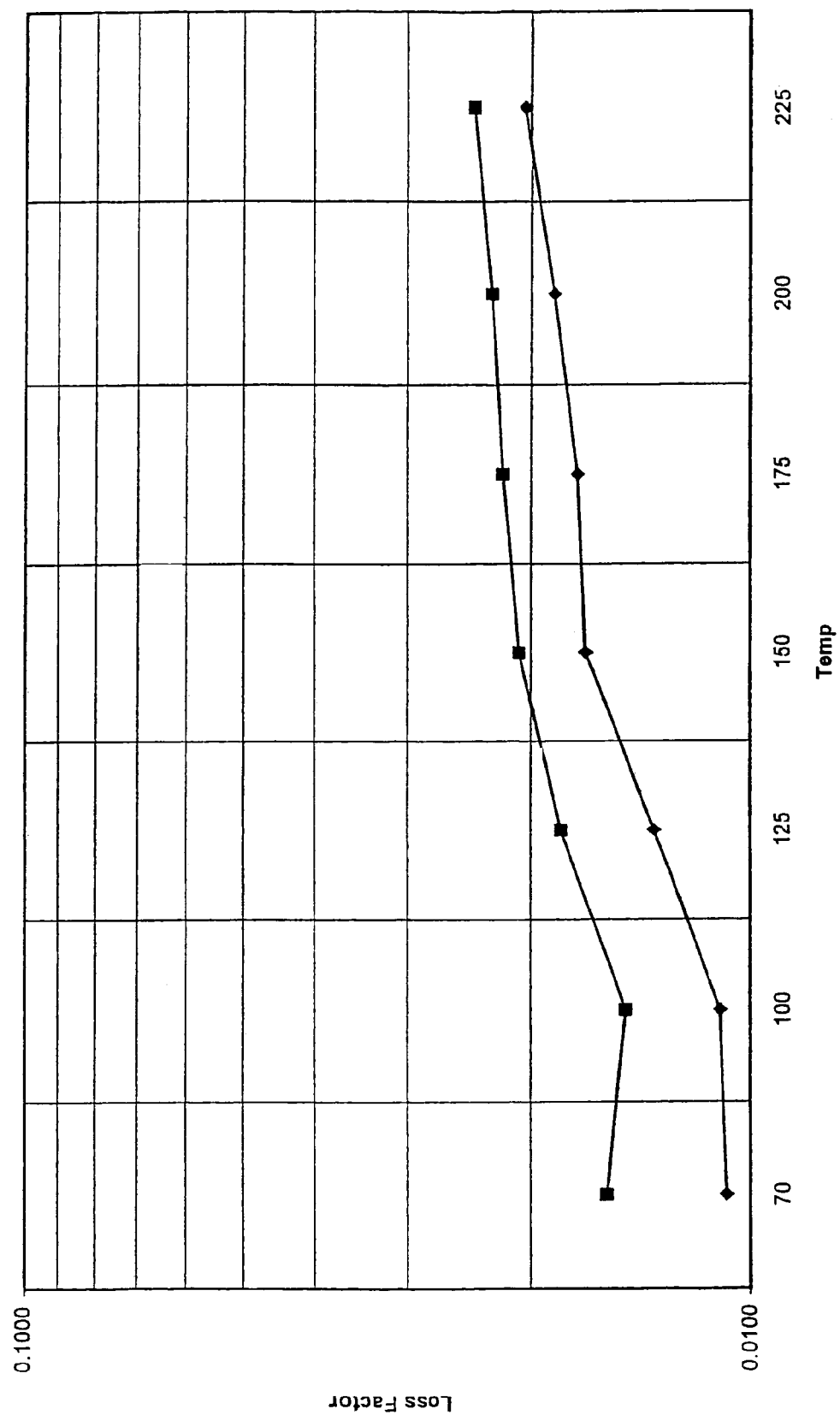

After molding, the laminates of Example 1 (designated SMC 36) and Comparative Example A (designated SMC 34, control) were subjected to two rounds of testing, and exhibited the following loss factors, which are illustrated in graphical form in FIGS. 5 and 6, respectively.

TABLE 1

(Loss Factor) for Example 1 and Comparative Example A

| Temperature (° F.) | Testing Round 1 | | Testing Round 2 | |
|---|---|---|---|---|
| | Example 1 | Comparative Example A | Example 1 | Comparative Example A |
| 70 | 0.017 | 0.0128 | 0.016 | 0.0108 |
| 100 | 0.017 | 0.0128 | 0.015 | 0.0110 |
| 125 | 0.020 | 0.0134 | 0.018 | 0.0136 |
| 150 | 0.022 | 0.0164 | 0.021 | 0.0168 |
| 175 | 0.023 | 0.0160 | 0.022 | 0.0172 |
| 200 | 0.025 | 0.0218 | 0.023 | 0.0186 |
| 225 | 0.027 | 0.0226 | 0.024 | 0.0204 |

The laminate of Example 1 exhibited average loss factors of 0.022 and 0.020 in rounds 1 and 2, respectively, compared to average loss factors of 0.0165 and 0.0155 for Comparative Example A. Hence, Example 1 exhibited loss factor improvement of 33% and 29% over Comparative Example A for rounds 1 and 2, respectively.

Example 2 and Comparative Example B

A damper precursor laminate was prepared containing a jelly roll f one layer of Arotech® 2002 SMC containing 60 weight percent glass and one viscoelastic layer adjacent the SMC layer. The laminate was rolled into a jelly roll (with an SMC outer layer) and had a charge weight of 513 grams.

The laminate of Example 2 was compared to a baseline/control laminate of Comparative Example B, which consisted of a SMC compound made from a damper precursor laminate jelly roll containing a layer of SMC as described above in Example 2, but with no damping layer. The laminate of Comparative Example B had a charge weight of 510 grams.

Figure 7:
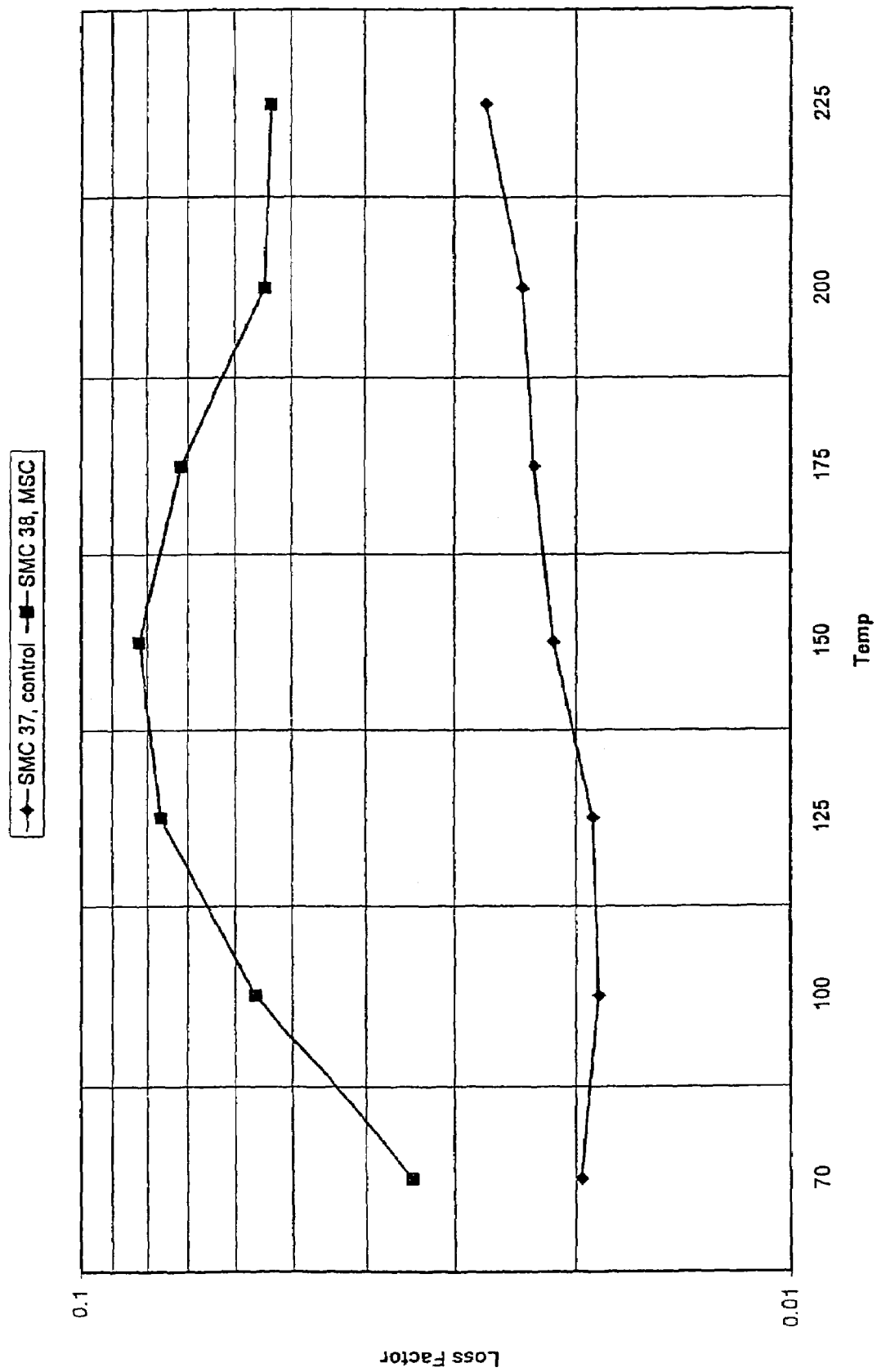
FIG. 7 and FIG. 8 each are graphs comparing the loss factors for Example 2 and Comparative Example B over a temperature range.
Figure 8:
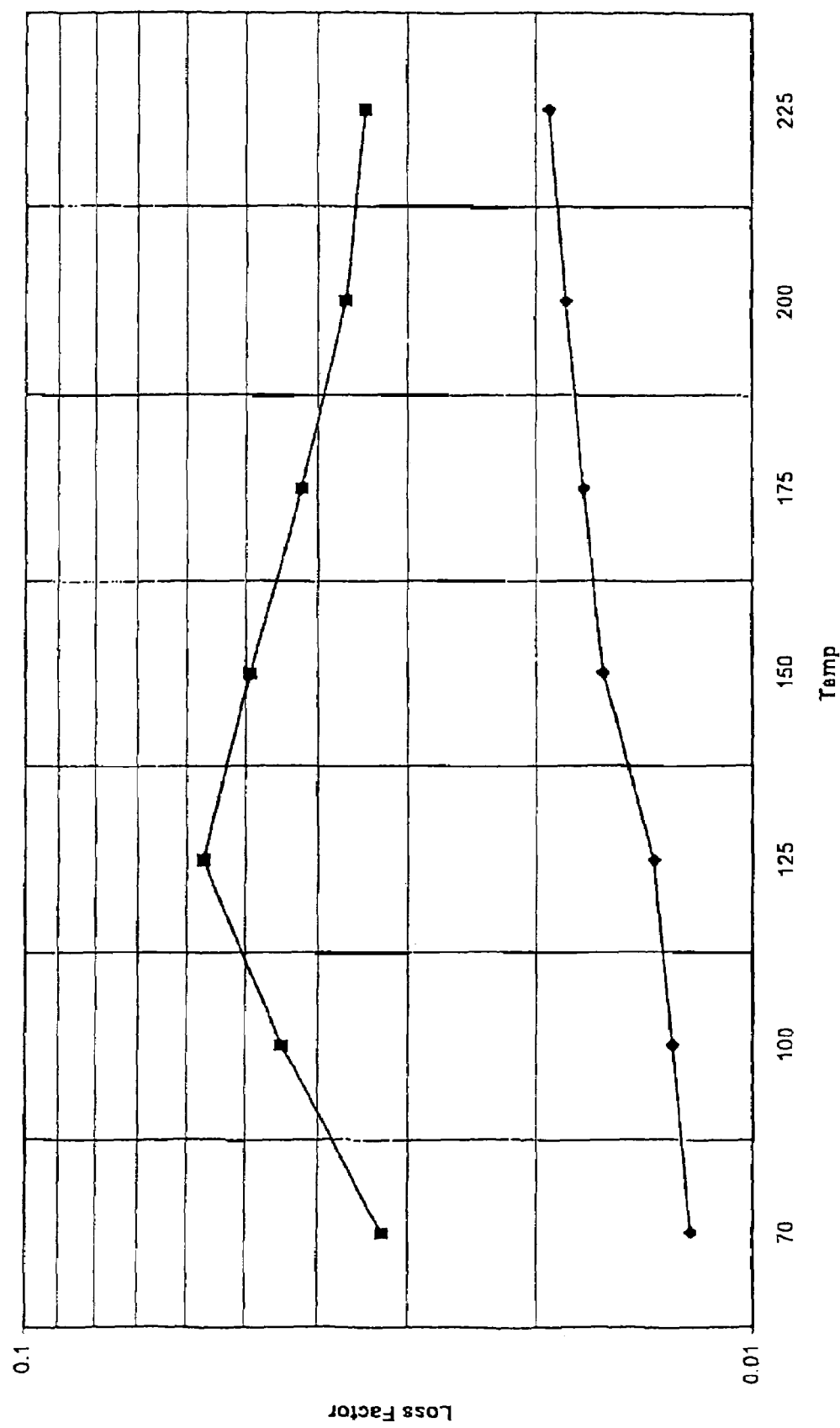

After molding, the laminates of Example 2 (designated SMC 38, MSC) and Comparative Example B (designated SMC 37, control) were subjected to two rounds of testing, and exhibited the following loss factors, which are illustrated in graphical form in FIGS. 7 and 8, respectively.

TABLE 2

(Loss Factor) for Example 2 and Comparative Example B

| Temperature (° F.) | Testing Round 1 | | Testing Round 2 | |
|---|---|---|---|---|
| | Example 2 | Comparative Example B | Example 2 | Comparative Example B |
| 70 | 0.0344 | 0.0196 | 0.0326 | 0.0122 |
| 100 | 0.0564 | 0.0186 | 0.0448 | 0.0129 |
| 125 | 0.0766 | 0.0189 | 0.057 | 0.0137 |
| 150 | 0.0824 | 0.0216 | 0.0494 | 0.0161 |
| 175 | 0.0716 | 0.023 | 0.0422 | 0.0172 |
| 200 | 0.0546 | 0.024 | 0.0366 | 0.0182 |
| 225 | 0.0534 | 0.027 | 0.0344 | 0.0192 |

Referring to Table 2, the laminate of Example 2 exhibited average loss factors of 0.0612 and 0.0424 in rounds 1 and 2, respectively, compared to average loss factors of 0.0218 and 0.0156 for Comparative Example B. Hence, Example 2 exhibited 181% and 172% loss factor improvements over Comparative Example B for rounds 1 and 2, respectively.

Example 3 and Comparative Example C

A damper precursor laminate was prepared containing six stacked layers of Arotech® 2002 SMC containing 60 weight percent glass and one viscoelastic layer inserted between the third and fourth SMC layers. The laminate had charge dimensions of 8 inches×8 inches and a weight of 1100 gram.

The laminate of Example 3 was compared to a baseline/control laminate of Comparative Example C, which consisted of a SMC compound made from a damper precursor laminate containing six-stacked layers of SMC as described above in Example 3, but with no damping layer. The laminate of Comparative Example C had charge dimensions of 8 inches×8 inches and a weight of 1100 grams.

Figure 9:
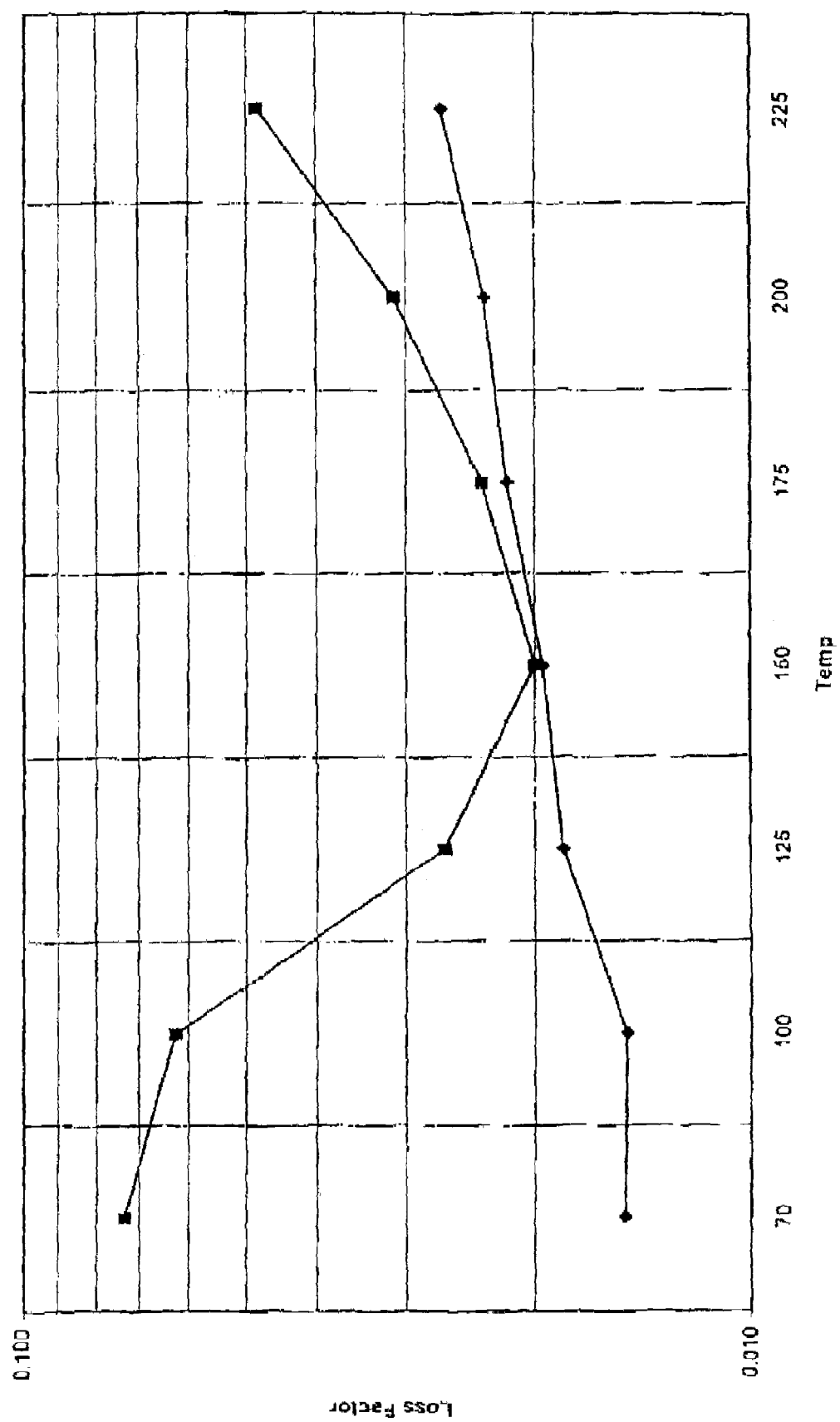
FIG. 9 and FIG. 10 each are graphs comparing the loss factors for Example 3 and Comparative Example C over a temperature range.
Figure 10:
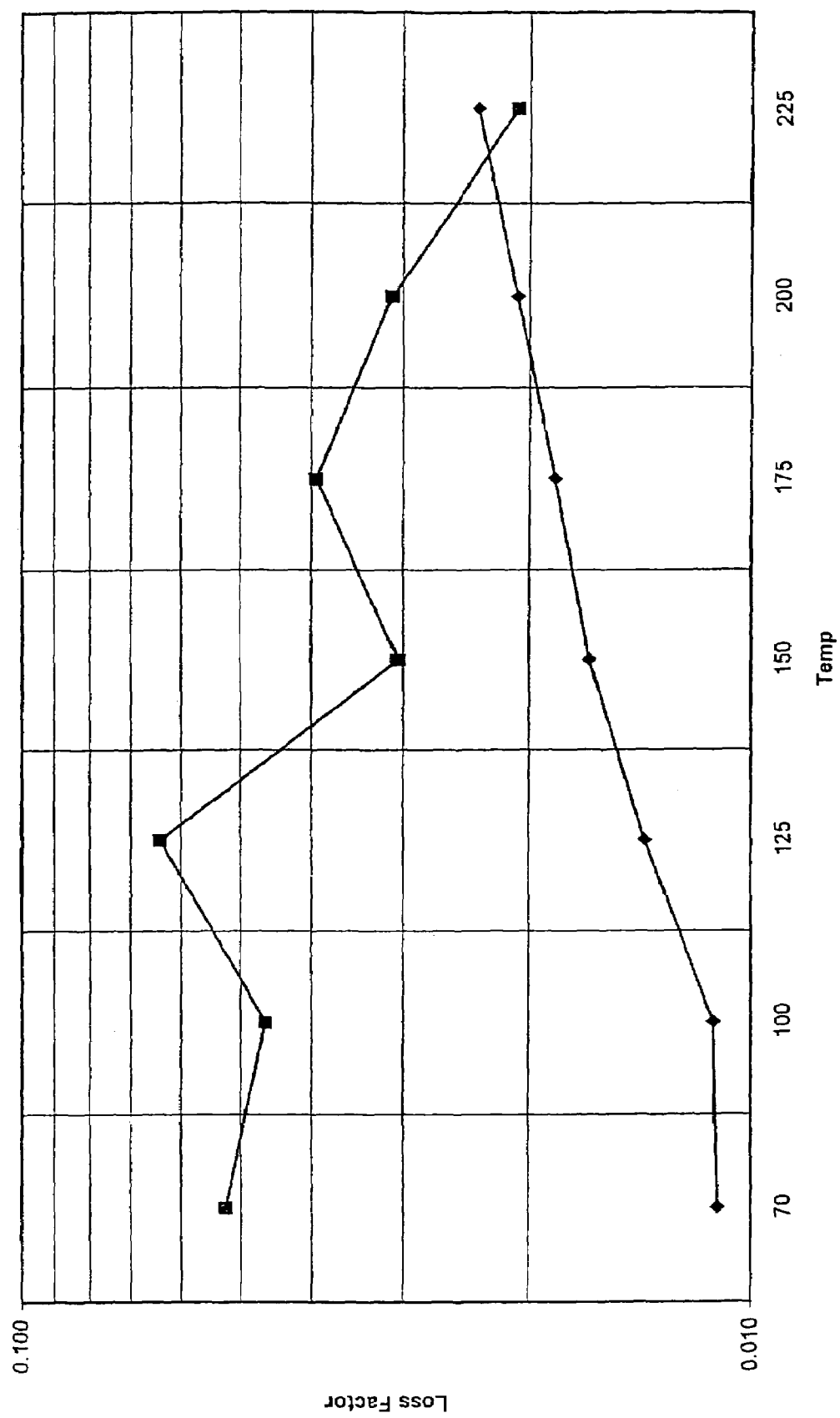

After molding, the laminates of Example 3 (designated SMC 39, MSC) and Comparative Example C (designated SMC 40, control) were subjected to two rounds of testing, and exhibited the following loss factors, which are illustrated in graphical form in FIGS. 9 and 10, respectively.

TABLE 3

(Loss Factor) for Example 3 and Comparative Example C

| Temperature (° F.) | Testing Round 1 | | Testing Round 2 | |
|---|---|---|---|---|
| | Example 3 | Comparative Example C | Example 3 | Comparative Example C |
| 70 | 0.073 | 0.015 | 0.052 | 0.011 |
| 100 | 0.062 | 0.015 | 0.046 | 0.011 |
| 125 | 0.027 | 0.018 | 0.064 | 0.014 |
| 150 | 0.020 | 0.020 | 0.030 | 0.017 |
| 175 | 0.024 | 0.022 | 0.039 | 0.018 |
| 200 | 0.031 | 0.023 | 0.031 | 0.021 |
| 225 | 0.048 | 0.027 | 0.021 | 0.024 |

Referring to Table 3, the laminate of Example 3 exhibited average loss factors of 0.041 and 0.040 in rounds 1 and 2, respectively, compared to average loss factors of 0.020 and 0.017 for Comparative Example C. Hence, Example 3 exhibited 105% and 135% loss factor improvements over Comparative Example C for rounds 1 and 2, respectively.

Example 4 and Comparative Example D

A damper precursor laminate was prepared containing two stacked layers of Arotech® 2002 SMC containing 60 weight percent glass and one viscoelastic layer inserted between the two SMC layers. The laminate had charge dimensions of 10 inches×10 inches.

The laminate of Example 4 was compared to a baseline/control laminate of Comparative Example D, which consisted of a SMC compound made from a damper precursor laminate containing two-stacked layers of SMC as described above in Example 4, but with no damping layer. The laminate of Comparative Example D had charge dimensions of 10 inches×10 inches.

Figure 11:
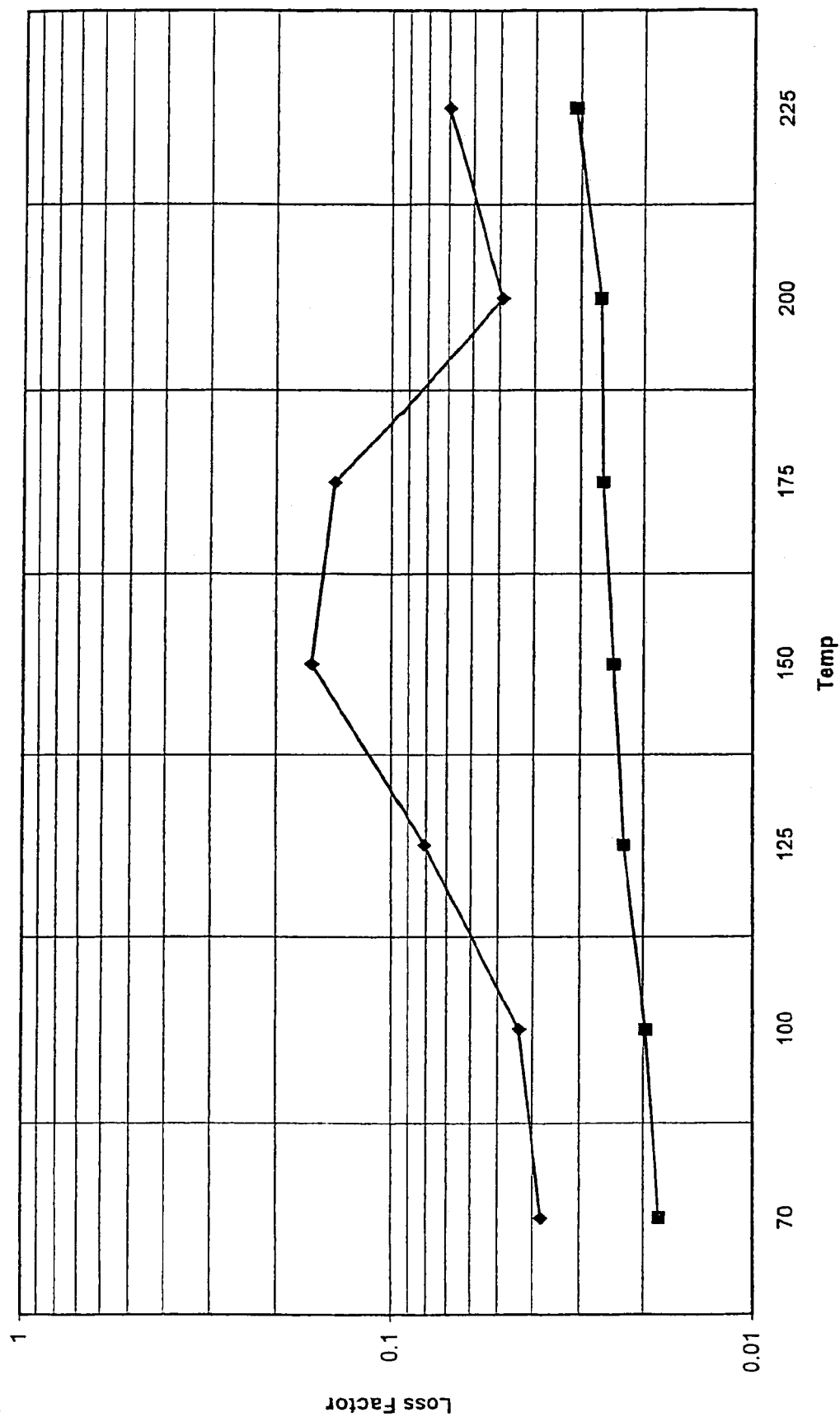
FIG. 11 and FIG. 12 each are graphs comparing the loss factors for Example 4 and Comparative Example D over a temperature range.
Figure 12:
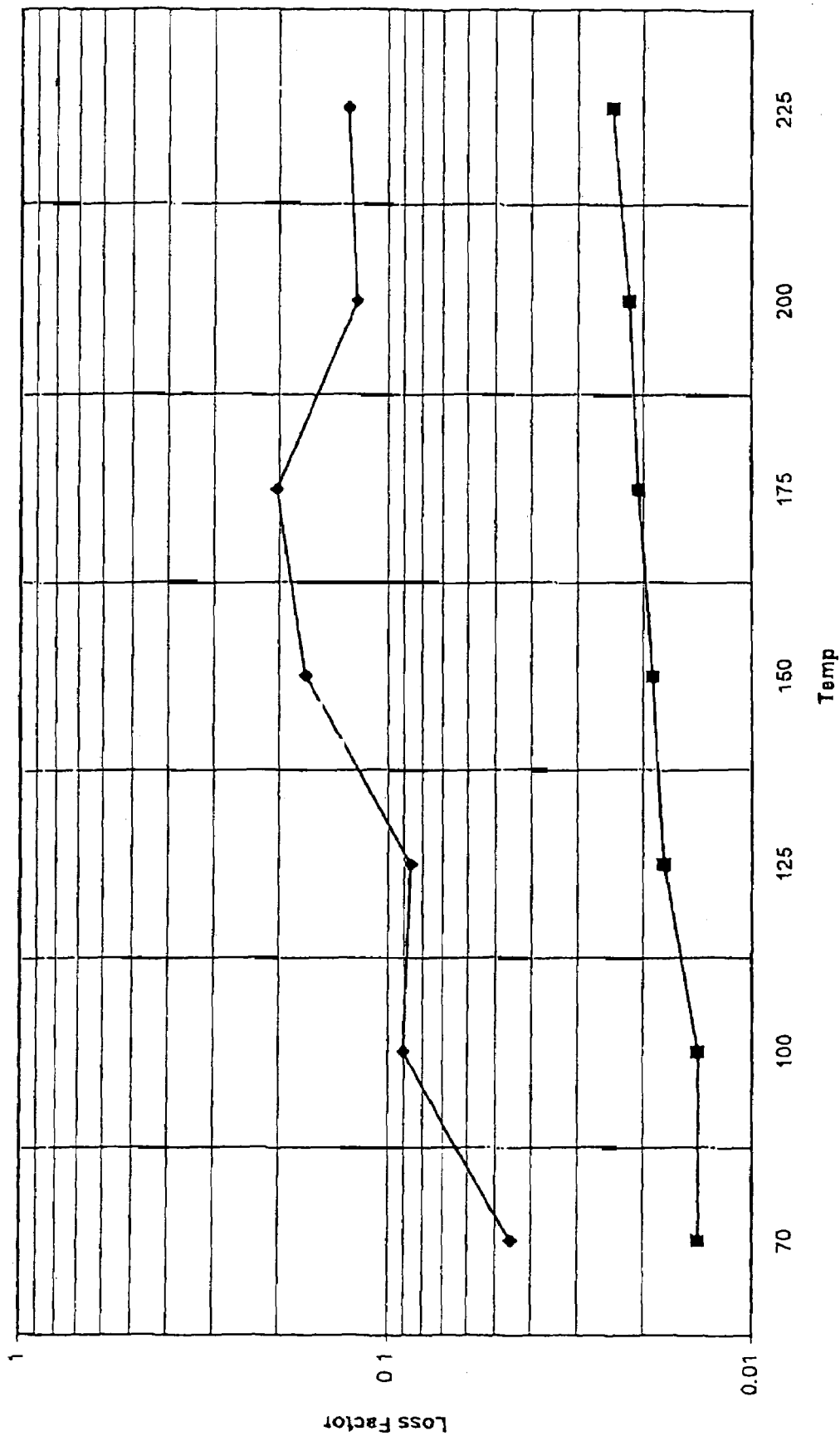

After molding, the laminates of Example 4 (designated SMC 41, MSC) and Comparative Example D (designated SMC 42, control) were subjected to two rounds of testing, and exhibited the following loss factors, which are illustrated in graphical form in FIGS. 11 and 12, respectively.

TABLE 4

(Loss Factor) for Example 4 and Comparative Example D

| Temperature (° F.) | Testing Round 1 | | Testing Round 2 | |
|---|---|---|---|---|
| | Example 4 | Comparative Example D | Example 4 | Comparative Example D |
| 70 | 0.038 | 0.0182 | 0.0456 | 0.0141 |
| 100 | 0.0438 | 0.0197 | 0.0906 | 0.0141 |
| 125 | 0.0812 | 0.0226 | 0.0864 | 0.0176 |
| 150 | 0.162 | 0.0242 | 0.1698 | 0.0188 |
| 175 | 0.141 | 0.0260 | 0.203 | 0.0206 |
| 200 | 0.0492 | 0.0264 | 0.1228 | 0.0218 |
| 225 | 0.07 | 0.0310 | 0.13 | 0.0242 |

Referring to Table 4, the laminate of Example 4 exhibited average loss factors of 0.084 and 0.12 in rounds 1 and 2, respectively, compared to average loss factors of 0.0240 and 0.0187 for Comparative Example D. Hence, Example 4 exhibited 250% and 542% loss factor improvements over Comparative Example D for rounds 1 and 2, respectively.

Examples 5 and 6 and Comparative Example E

A damper precursor laminate designated Example 5 was prepared containing six stacked layers of Arotech® 2002 SMC containing 60 weight percent glass and one viscoelastic layer inserted between the third and fourth SMC layers. Another damper precursor laminate designated Example 6 was prepared containing six stacked layers of Arotech® 2002 SMC containing 60 weight percent glass, and three viscoelastic layers inserted between the third and the fourth SMC layers. Both laminates had charge dimensions of 3 inches×10 inches.

The laminates of Examples 5 and 6 were compared to a baseline/control laminate of Comparative Example E, which consisted of a SMC compound made from a damper precursor laminate containing six-stacked layers of SMC as described above in Examples 5 and 6, but with no damping layer(s). The laminate of Comparative Example E had charge dimensions of 3 inches×10 inches.

Figure 13:
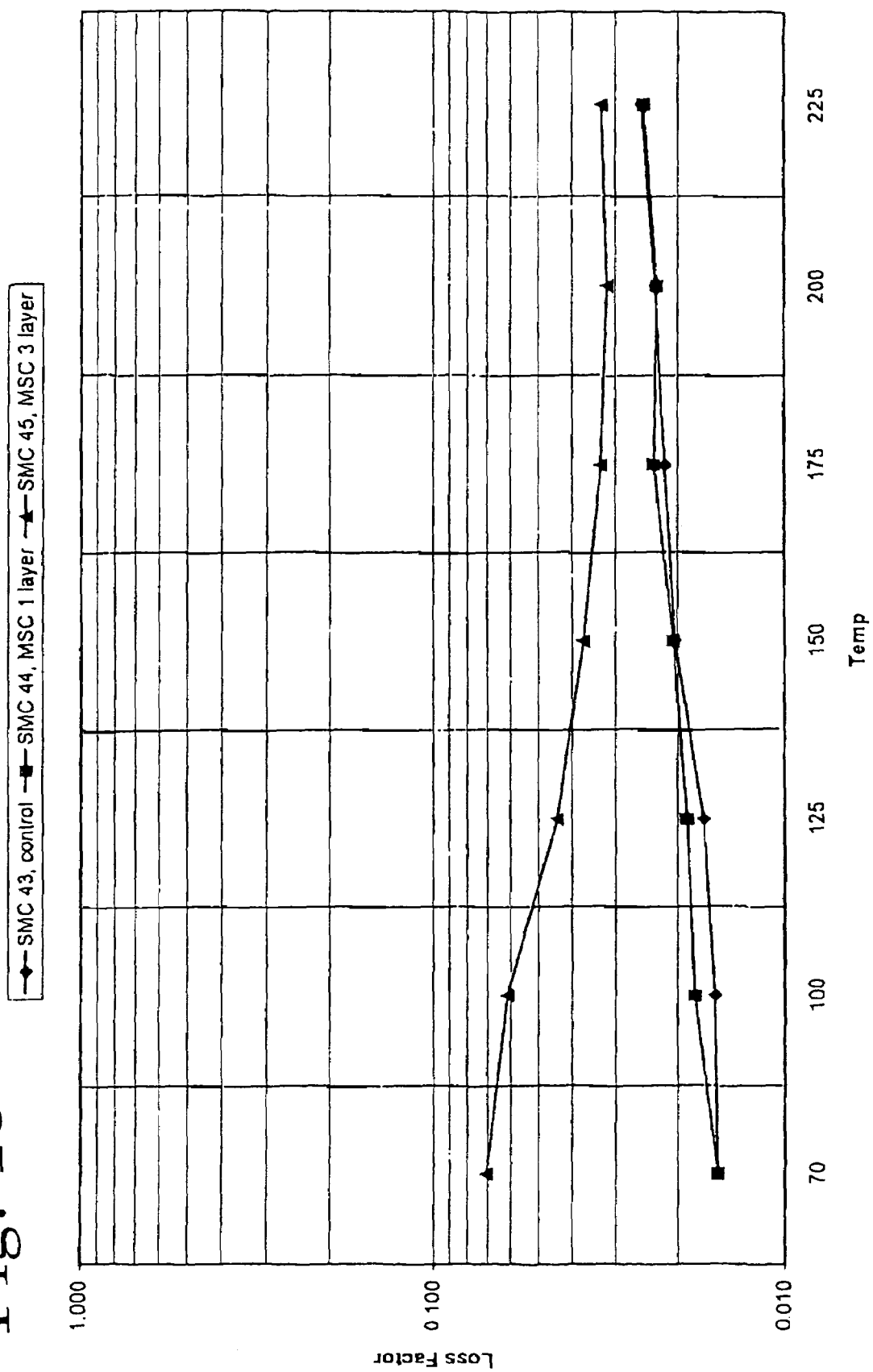
FIG. 13 and FIG. 14 each are graphs comparing the loss factors for Examples 5 and 6 and Comparative Example E over a temperature range.
Figure 14:
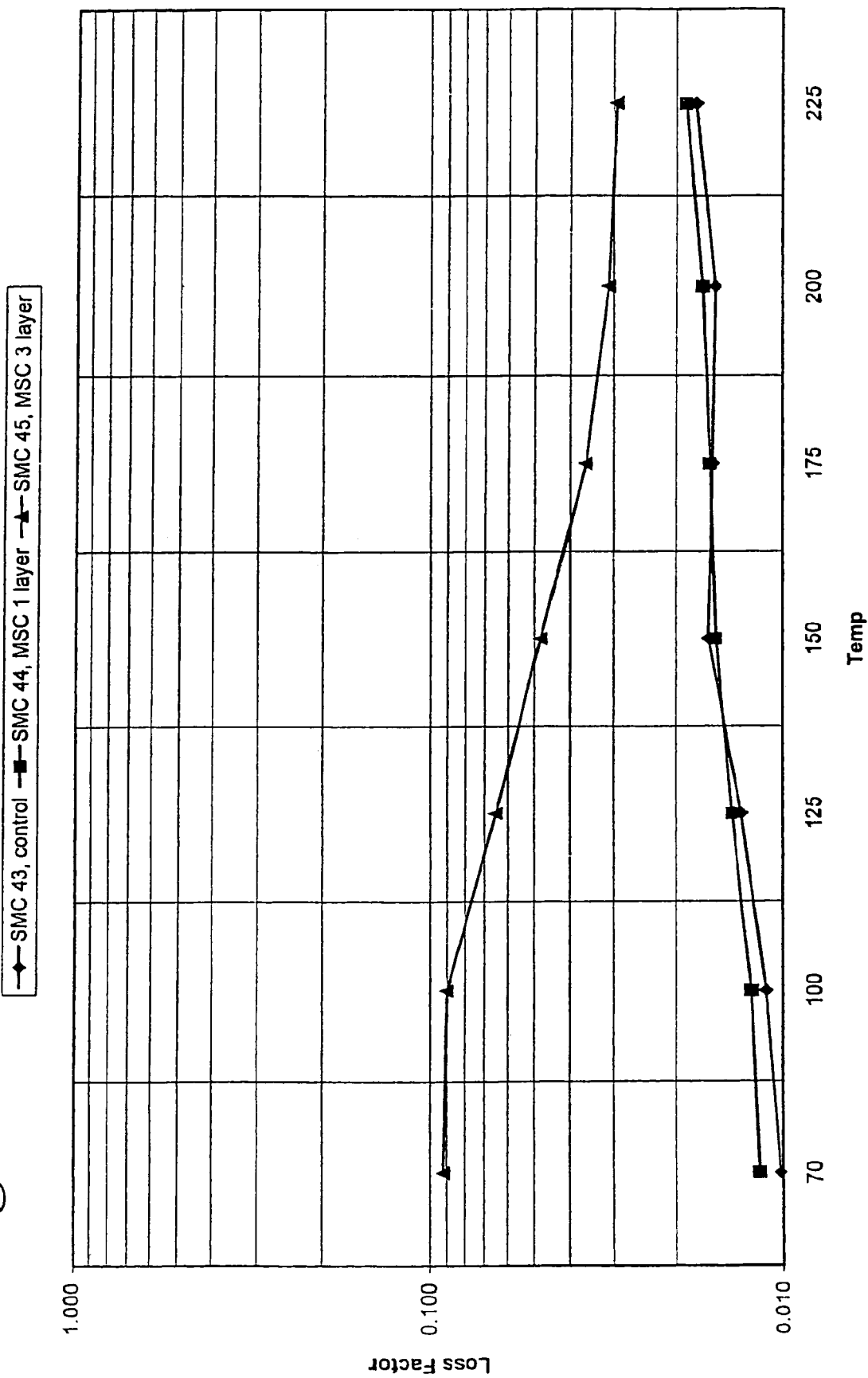

After molding, the laminates of Examples 5 and 6 (designated SMC 44 and SMC 45, respectively) and Comparative Example E (designated SMC 43, control) were subjected to two rounds of testing, and exhibited the following loss factors, which are illustrated in graphical form in FIGS. 13 and 14, respectively.

TABLE 5

(Loss Factor) for Examples 5 & 6 and Comparative Example E

| Temp. (° F.) | Testing Round 1 | | | Testing Round 2 | | |
|---|---|---|---|---|---|---|
| | Ex. 5 | Ex. 6 | Comp. Ex. E | Ex. 5 | Ex. 6 | Comp. Ex. E |
| 70 | 0.015 | 0.071 | 0.016 | 0.012 | 0.092 | 0.010 |
| 100 | 0.018 | 0.061 | 0.016 | 0.012 | 0.090 | 0.011 |
| 125 | 0.019 | 0.044 | 0.017 | 0.014 | 0.065 | 0.013 |
| 150 | 0.021 | 0.037 | 0.020 | 0.016 | 0.048 | 0.016 |
| 175 | 0.023 | 0.033 | 0.022 | 0.016 | 0.036 | 0.016 |
| 220 | 0.023 | 0.032 | 0.023 | 0.017 | 0.031 | 0.016 |
| 225 | 0.025 | 0.033 | 0.025 | 0.019 | 0.029 | 0.018 |

Referring to Table 5, the laminate of Example 6 exhibited average loss factors of 0.044 and 0.056 in rounds 1 and 2, respectively, compared to average loss factors of 0.020 and 0.014 for Comparative Example E. Hence, Example 6 exhibited 120% and 300% loss factor improvements over Comparative Example E for rounds 1 and 2, respectively.

Examples 7 and 8 and Comparative Example F

A damper precursor laminate designated Example 7 was prepared containing six stacked layers of SLI-272 SMC containing 27 weight percent glass and one viscoelastic layer inserted between the third and fourth SMC layers. Another damper precursor laminate designated Example 8 was prepared containing six stacked layers of SLI-272 SMC containing 27 weight percent glass, and three viscoelastic layers inserted between the third and the fourth SMC layers. Both laminates had charge dimensions of 3 inches×10 inches.

The laminates of Examples 7 and 8 were compared to a baseline/control laminate of Comparative Example F, which consisted of a SMC compound made from a damper precursor laminate containing six-stacked layers of SMC as described above in Examples 7 and 8, but with no damping layer(s). The laminate of Comparative Example F had charge dimensions of 3 inches×10 inches.

Figure 15:
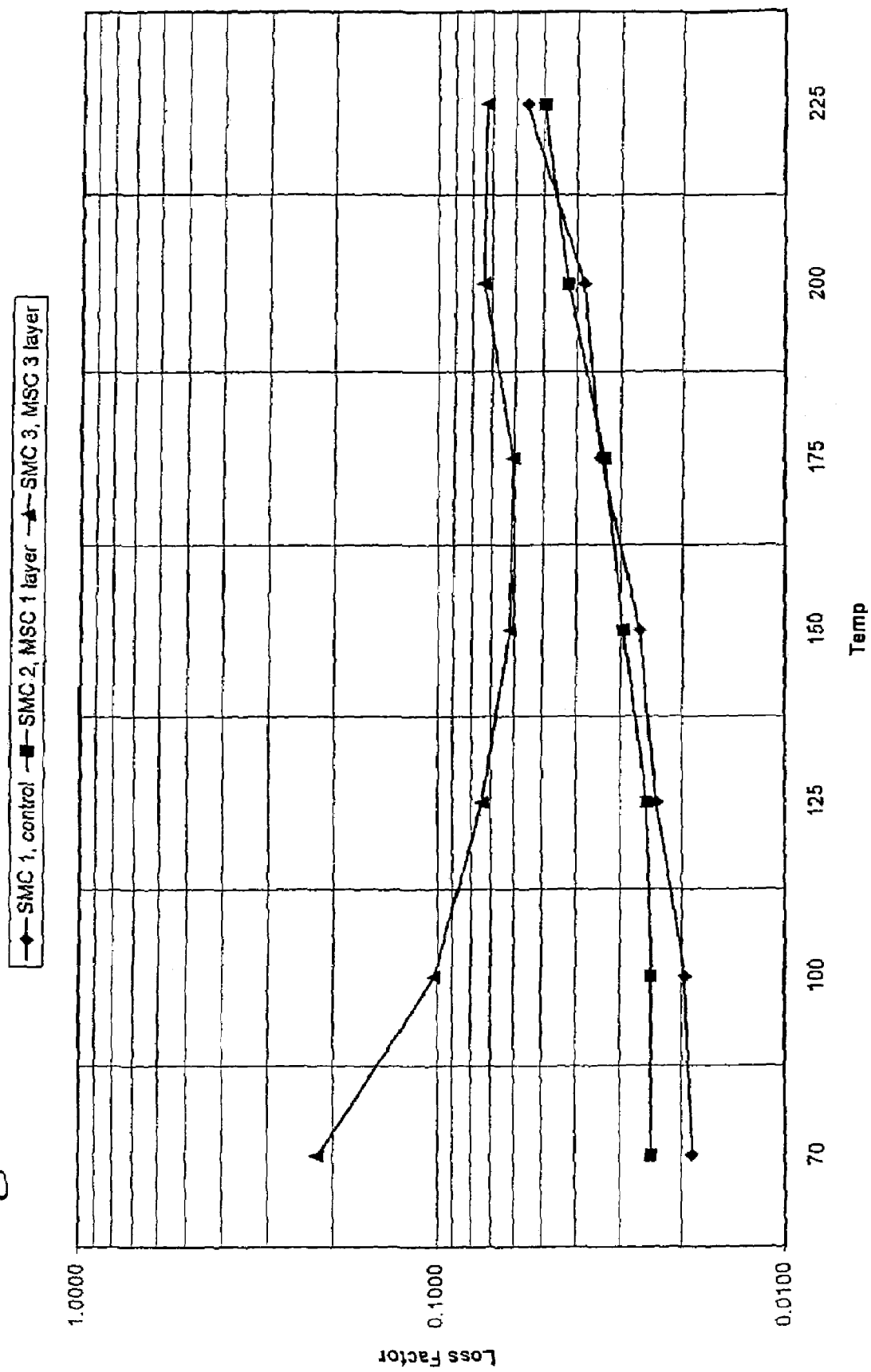
FIG. 15 and FIG. 16 each are graphs comparing the loss factors for Examples 7 and 8 and Comparative Example F over a temperature range.
Figure 16:
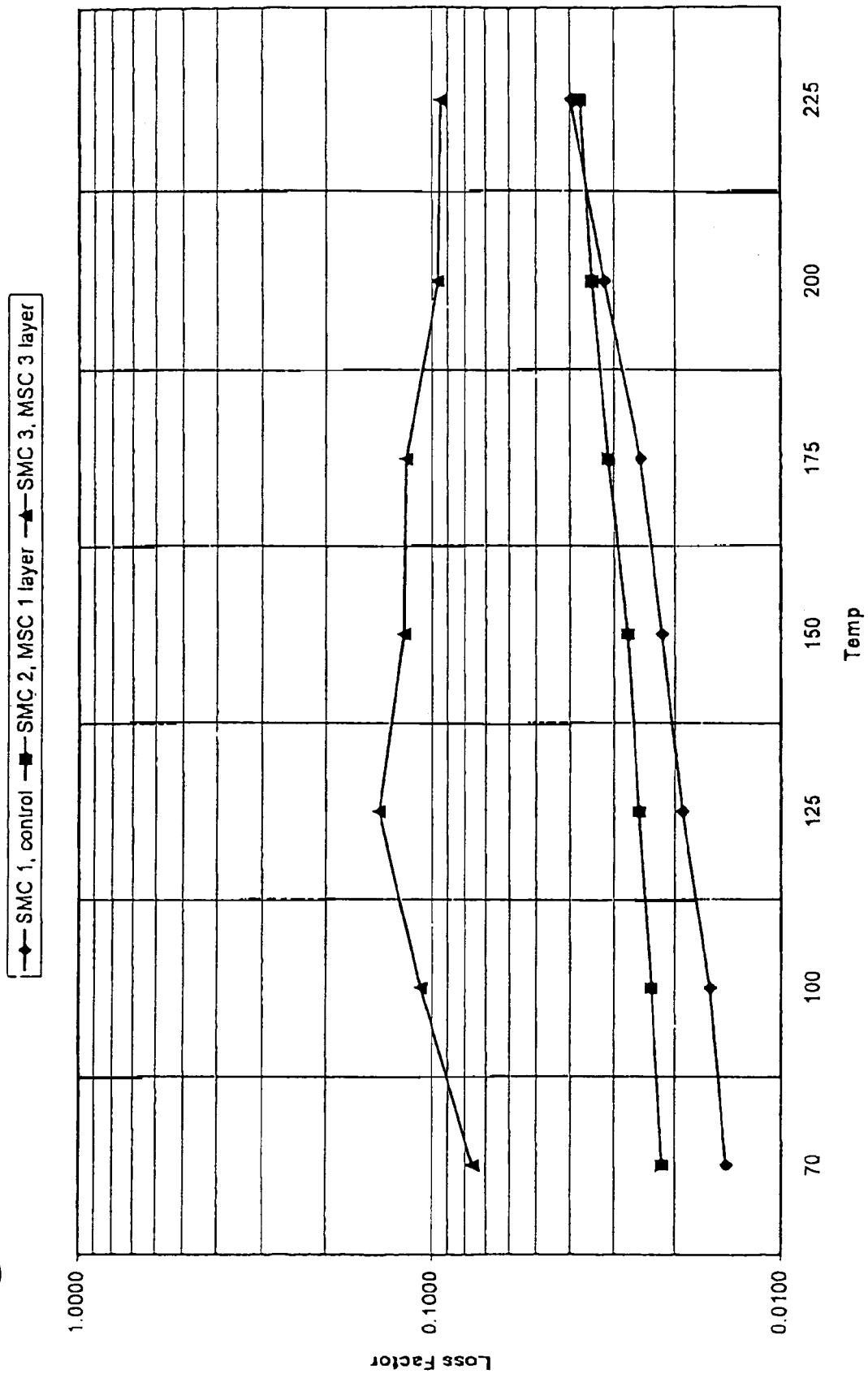

After molding, the laminates of Examples 7 and 8 (designated SMC 2 and SMC 3, respectively) and Comparative Example F (designated SMC 1, control) were subjected to two rounds of testing, and exhibited the following loss factors, which are illustrated in graphical form in FIGS. 15 and 16, respectively.

TABLE 6

(Loss Factor) for Examples 7 & 8 and Comparative Example F

| Temp. (° F.) | Testing Round 1 | | | Testing Round 2 | | |
|---|---|---|---|---|---|---|
| | Ex. 7 | Ex. 8 | Comp. Ex. F | Ex. 7 | Ex. 8 | Comp. Ex. F |
| 70 | 0.0244 | 0.221 | 0.0187 | 0.0218 | 0.0762 | 0.0144 |
| 100 | 0.0244 | 0.1022 | 0.0196 | 0.0234 | 0.108 | 0.0159 |
| 125 | 0.0252 | 0.0742 | 0.0236 | 0.0254 | 0.1412 | 0.0190 |
| 150 | 0.0296 | 0.0618 | 0.0266 | 0.0274 | 0.12 | 0.0218 |
| 175 | 0.0334 | 0.0606 | 0.0342 | 0.0312 | 0.1184 | 0.0252 |
| 220 | 0.0424 | 0.074 | 0.0382 | 0.0346 | 0.096 | 0.0320 |
| 225 | 0.0498 | 0.0728 | 0.0558 | 0.0374 | 0.0942 | 0.0398 |

Referring to Table 6, the laminate of Example 8 exhibited average loss factors of 0.0952 and 0.108 in rounds 1 and 2, respectively, compared to average loss factors of 0.0310 and 0.0240 for Comparative Example F. Hence, Example 8 exhibited 207% and 350% loss factor improvements over Comparative Example F for rounds 1 and 2, respectively.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A damper component for absorbing and dissipating vibration and/or noise resonation, the damper component comprising:
    a damper layer having opposite surfaces and edges, the damper layer comprising a viscoelastomer; and
    a continuous constraining layer contacting the opposite surfaces and the edges of the damper layer to completely encase the damper layer, the constraining layer having a greater stiffness and higher modulus of dynamic shearing elasticity than the damper layer, the constraining layer comprising a molded polyester sheet molding compound that is substantially immiscible with the viscoelastomer to provide a discrete interface between the constraining layer and the damper layer.

2. A damper component according to claim 1, wherein the viscoelastomer comprises a polymeric reaction product of a composition comprising a member selected from the group consisting of (meth)acrylic acid and (meth)acrylate.

3. A damper component according to claim 1, wherein the viscoelastomer comprises a polyacrylate.

4. A damper component according to claim 1, wherein the viscoelastomer comprises a member selected from the group consisting of nitrile rubbers and fluoroelastomers.

5. A damper component according to claim 1, wherein the damper layer is free of fillers.

6. A damper component according to claim 1, wherein the continuous constraining layer further comprises high density filler comprising a member selected from the group consisting of glass, carbon, aramids, metal, plastics, alumina, silica, silicon, ceramic, and graphite.

7. A damper component according to claim 1, wherein the continuous constraining layer further comprises chopped fiberglass.

8. A damper component according to claim 1, wherein the modulus of dynamic shearing elasticity of the continuous constraining layer is at least two orders of magnitude greater than that of the viscoelastomer.

9. A damper component according to claim 1, wherein the modulus of dynamic shearing elasticity of the continuous constraining layer is at least three orders of magnitude greater than that of the viscoelastomer.

10. A damper component according to claim 1, wherein the modulus of dynamic shearing elasticity of the continuous constraining layer is at least about 500,000 psi.

11. A damper component according to claim 1, wherein the damper layer has a thickness in a range of 2.54 microns to 254 microns.

12. A damper component according to claim 1, wherein the continuous constraining layer comprises first and second sheets contacting the opposite surfaces, respectively, and consolidated with one another.

13. A damper component for absorbing and dissipating vibration and/or noise resonation, the damper component comprising:
   first and second damper layers each having opposite first and second surfaces and edges, each of the damper layers comprising a viscoelastomer; and
   a continuous constraining layer contacting the opposite surfaces and the edges of the damper layers to completely encase the damper layers, the constraining layer having a greater stiffness and higher modulus of dynamic shearing elasticity than the damper layers, the constraining layer comprising a molded polyester sheet molding compound that is substantially immiscible with the viscoelastomer to provide a discrete interface between the constraining layer and the damper layers.

14. A damper component according to claim 13, wherein the viscoelastomer comprises a polymeric reaction product of a composition comprising a member selected from the group consisting of (meth)acrylic acid and (meth)acrylate.

15. A damper component according to claim 13, wherein the viscoelastomer comprises a polyacrylate.

16. A damper component according to claim 13, wherein the viscoelastomer comprises a member selected from the group consisting of nitrile rubbers and fluoroelastomers.

17. A damper component according to claim 13, wherein the damper layers are free of fillers.

18. A damper component according to claim 13, wherein the continuous constraining layer further comprises high density filler comprising a member selected from the group consisting of glass, carbon, aramids, metal, plastics, alumina, silica, silicon, ceramic, and graphite.

19. A damper component according to claim 13, wherein the continuous constraining layer further comprises chopped fiberglass.

20. A damper component according to claim 13, wherein the modulus of dynamic shearing elasticity of the continuous constraining layer is at least two orders of magnitude greater than that of the viscoelastomer.

21. A damper component according to claim 13, wherein the modulus of dynamic shearing elasticity of the continuous constraining layer is at least three orders of magnitude greater than that of the viscoelastomer.

22. A damper component according to claim 13, wherein the modulus of dynamic shearing elasticity of the continuous constraining layer is at least about 500,000 psi.

23. A damper component according to claim 13, wherein the damper layers each have a thickness in a range of 2.54 microns to 254 microns.

24. A damper component according to claim 13, wherein the continuous constraining layer comprises:
   a first sheet contacting a first surface of the first damper layer;
   a second sheet contacting a first surface of the second damper layer; and
   a third sheet contacting a second surface of the first damper layer and further contacting a second surface of the second damper layer, wherein the first and third sheets are consolidated with one another to completely encase the first damper layer, and wherein the second and third sheets are consolidated with one another to completely encase the second damper layer.

* * * * *